United States Patent [19]

Igashira et al.

[11] Patent Number: 4,535,743

[45] Date of Patent: Aug. 20, 1985

[54] FUEL INJECTION APPARATUS FOR AN INTERNAL COMBUSTION ENGINE

[75] Inventors: Toshihiko Igashira, Toyokawa; Taro Tanaka, Nagoya; Yasuyuki Sakakibara, Nishio, all of Japan

[73] Assignee: Nippon Soken, Inc., Nishio, Japan

[21] Appl. No.: 598,436

[22] Filed: Apr. 9, 1984

[30] Foreign Application Priority Data

| Apr. 15, 1983 [JP] | Japan | 58-65603 |
| Jun. 17, 1983 [JP] | Japan | 58-107954 |
| Aug. 12, 1983 [JP] | Japan | 58-146731 |

[51] Int. Cl.³ .............................................. B05B 1/30
[52] U.S. Cl. .................................... 123/472; 123/478; 123/584
[58] Field of Search ............... 123/472, 478; 239/585, 239/584, 533.1–533.4

[56] References Cited

U.S. PATENT DOCUMENTS

| 3,282,512 | 11/1966 | Bluhm et al. | 239/584 |
| 3,339,848 | 9/1967 | Geiger | 239/584 |
| 3,501,099 | 3/1970 | Benson | 239/585 |
| 3,738,576 | 6/1973 | O'Neill | 239/533 |
| 3,995,813 | 12/1976 | Bart et al. | 239/584 |
| 4,022,166 | 5/1977 | Bart | 239/584 |
| 4,438,496 | 3/1984 | Ohie | 123/472 |
| 4,471,256 | 9/1984 | Igashira et al. | 239/585 |

Primary Examiner—Raymond A. Nelli
Attorney, Agent, or Firm—Cushman, Darby & Cushman

[57] ABSTRACT

A fuel injection apparatus for an internal combustion engine comprising: a nozzle body; a nozzle formed at the bottom of the nozzle body; an electroexpansive actuator having the electroexpansive effect; a valve member, slideably mounted within the nozzle body; and a fuel chamber formed between the electroexpansive actuator and the valve member. When the electroexpansive actuator expands to reduce the volume of the fuel chamber, the valve member is moved in the closed direction of the nozzle. When the electroexpansive actuator contracts to increase the volume of the fuel chamber, the valve member is moved in the open direction of the nozzle.

22 Claims, 59 Drawing Figures

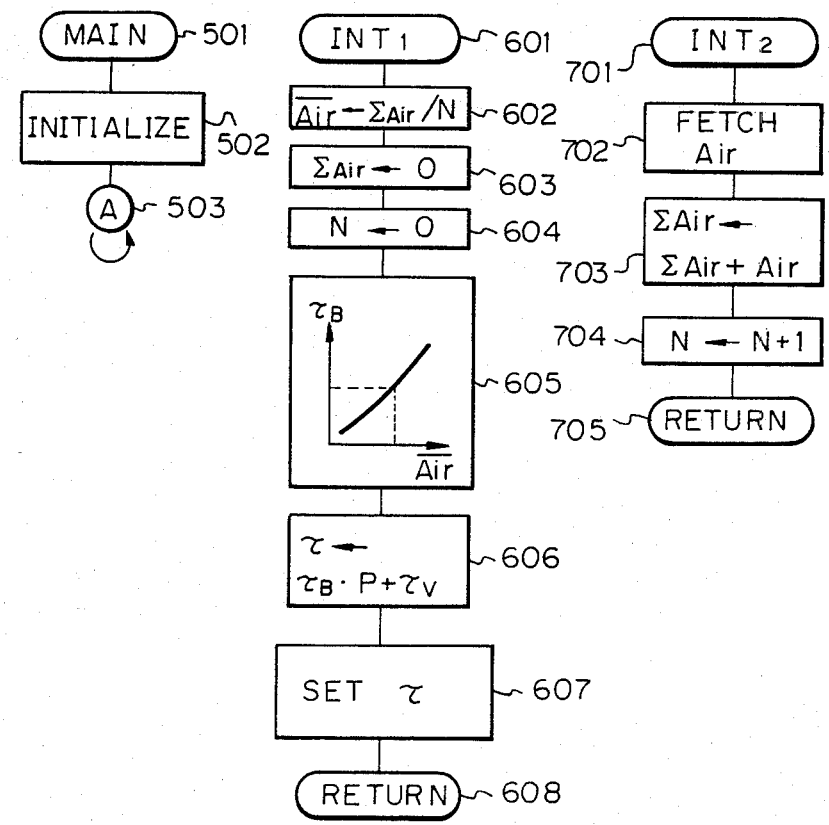

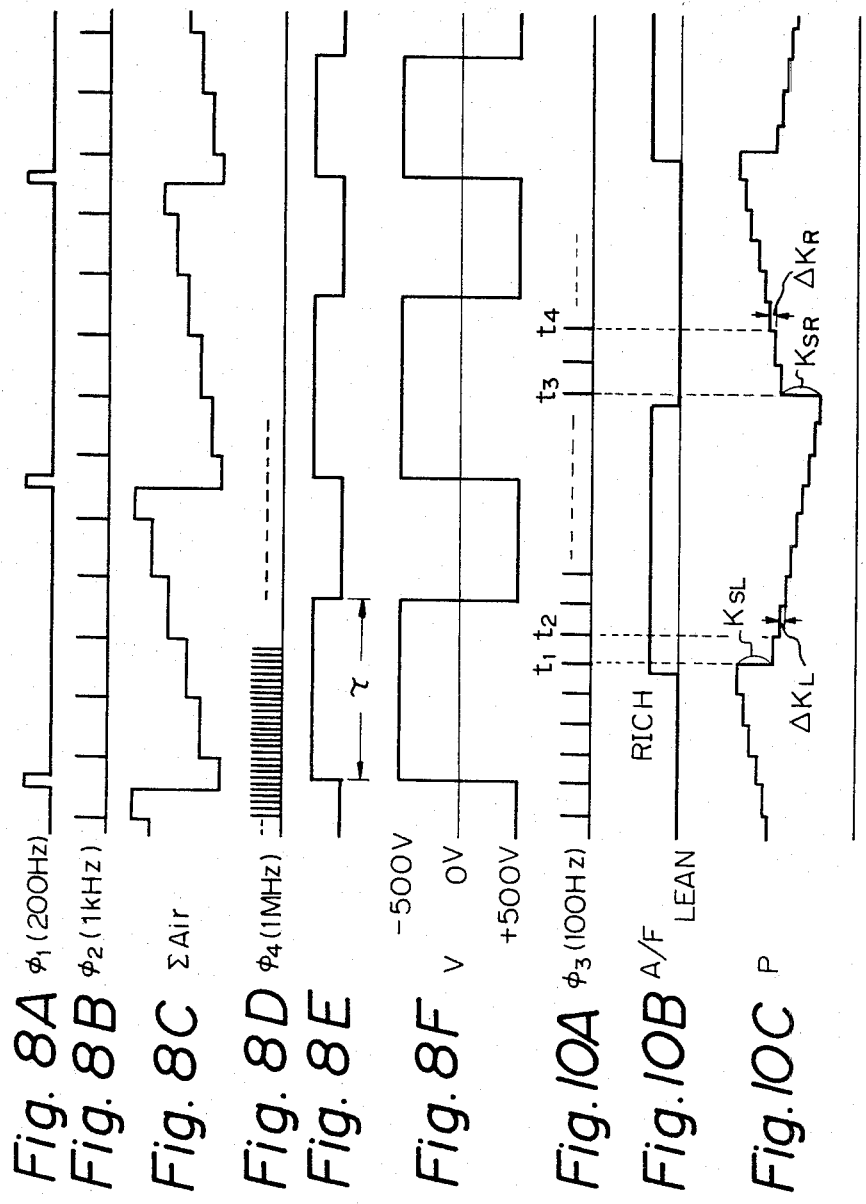

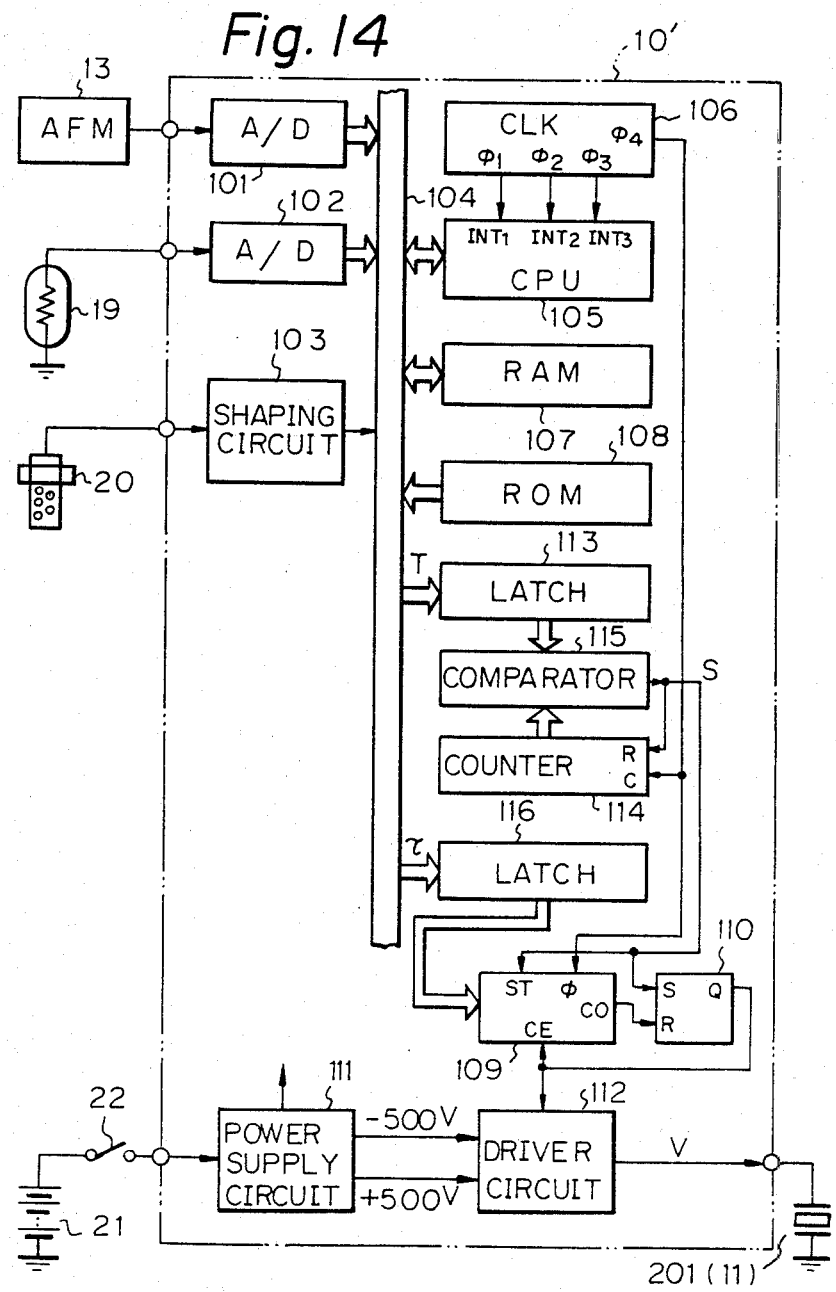

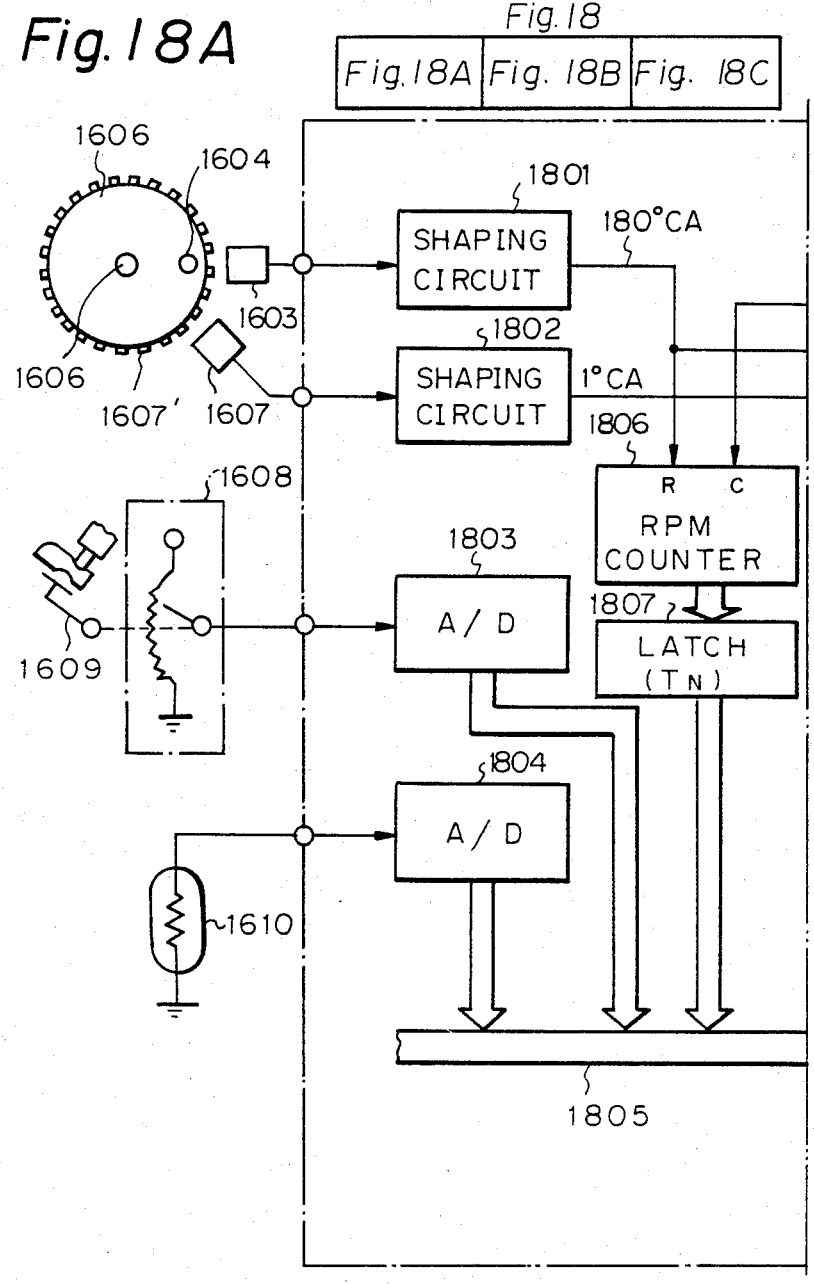

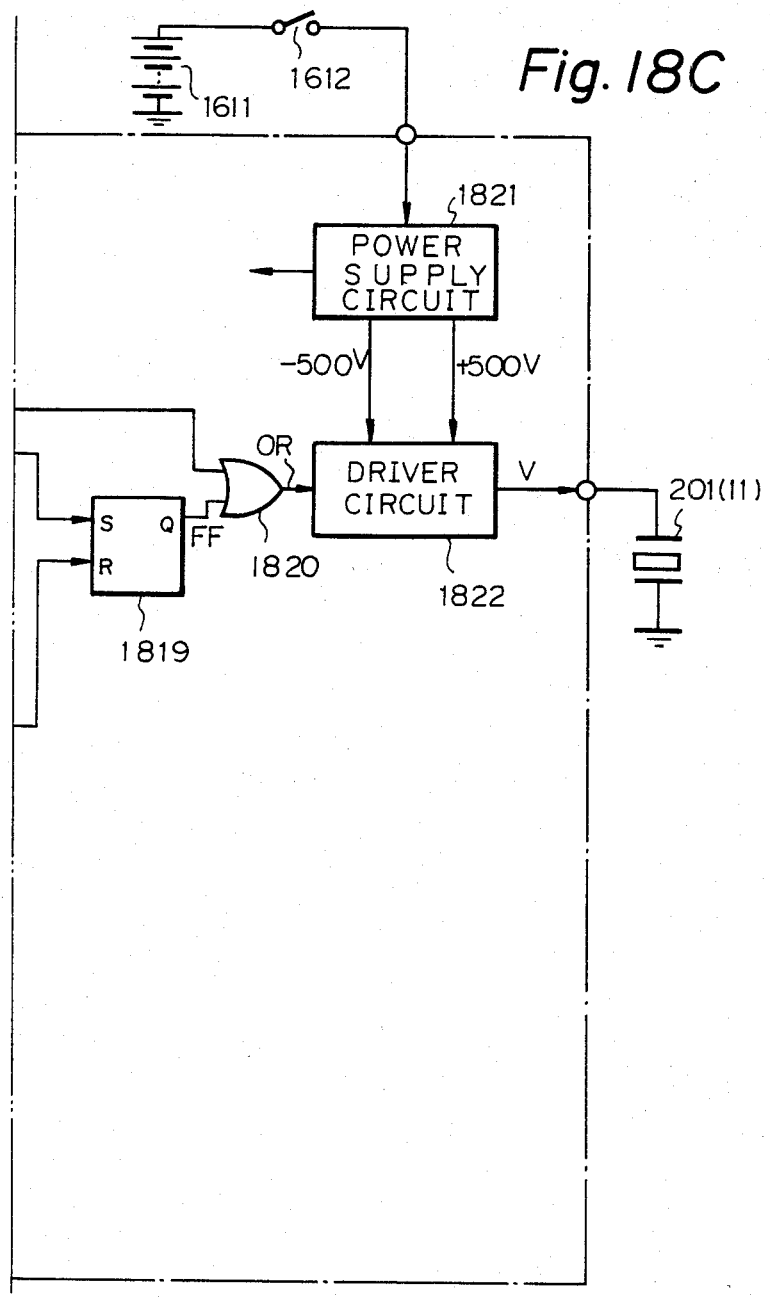

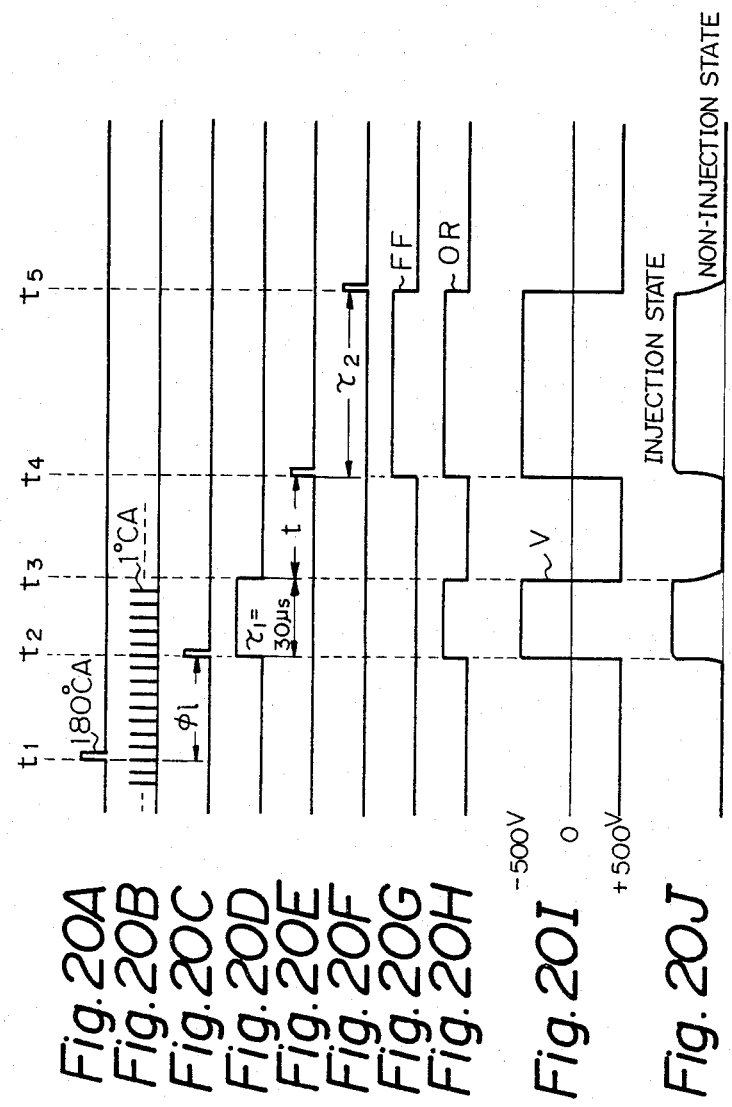

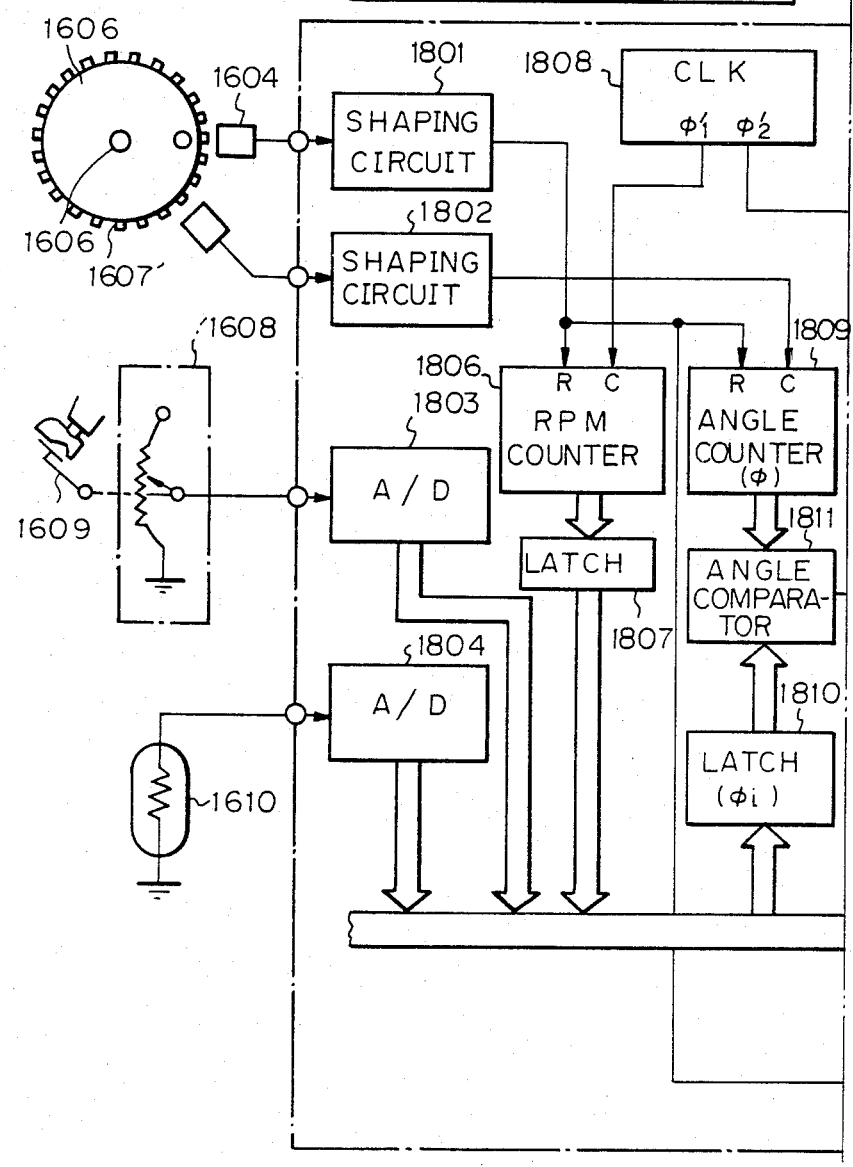

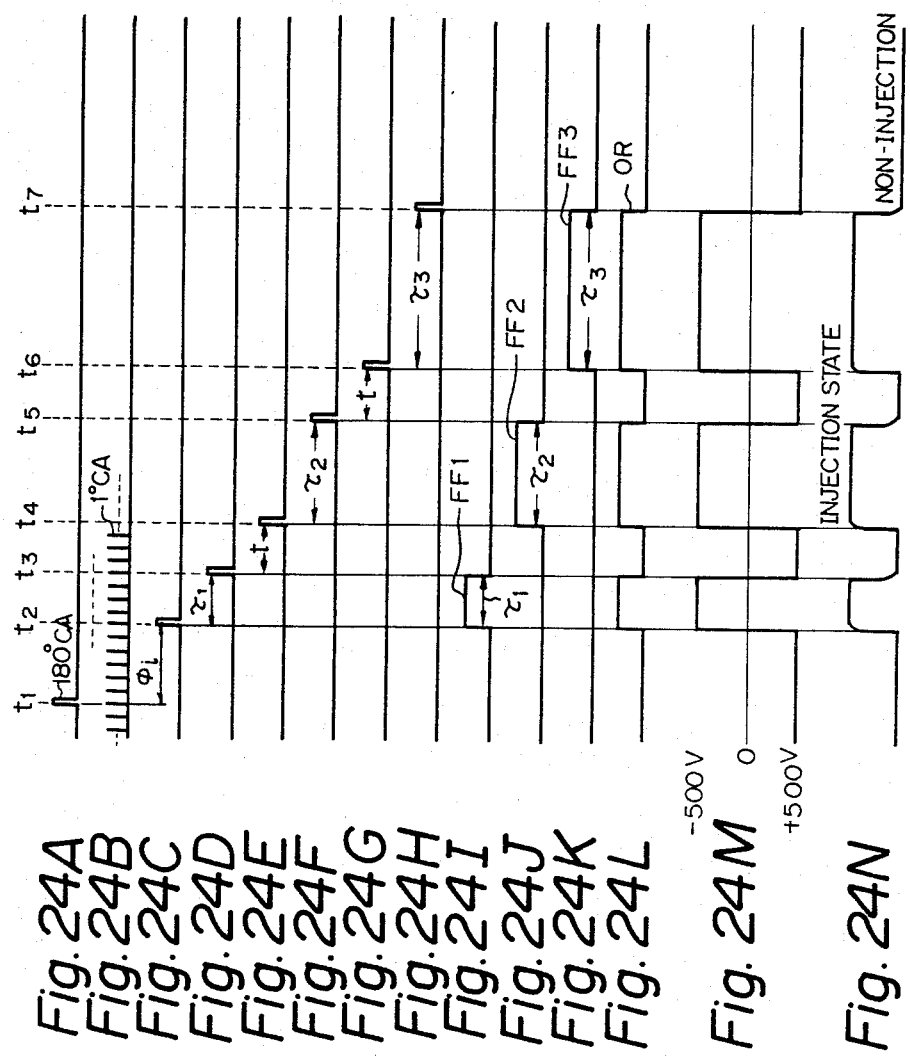

FUEL INJECTION APPARATUS FOR AN INTERNAL COMBUSTION ENGINE

BACKGROUND OF THE INVENTION

1. Field of the Invention

The present invention relates to a fuel injection apparatus for an internal combustion engine in which an electroexpansive actuator is arranged so as to enable precise and rapid response to an electric signal.

2. Description of the Prior Art

Most conventional prior art fuel injection apparatuses for internal combustion engines incorporate solenoid actuators. Such solenoid actuators generally have response times larger than 10 ms, which impedes engine performance and fuel efficiency.

In order to improve the response time, recent fuel injection apparatuses have been equipped with electroexpansive actuators. While such electroexpansive actuators offer faster response times, they suffer from the disadvantage of small needle lift. Accordingly, they are not suited for large injected fuel amounts.

In addition, it was impossible to continuously control the fuel injection amount in accordance with the driving frequency in a spark-ignition engine. In a diesel engine, it was impossible to compensate for a delay of compression ignition.

SUMMARY OF THE INVENTION

It is an object of the present invention to provide a fuel injection apparatus using an electroexpansive actuator, which apparatus enables large injected fuel amounts with precise and rapid response to an electrical signal.

In accordance with the present invention, the electroexpansive actuator is used only to trigger the opening and closing of an injection nozzle. The actual opening, closing, and maintaining the state of the injection nozzle is effected using pressurized fuel.

BRIEF DESCRIPTION OF THE DRAWINGS

The present invention will be more clearly understood from the description as set forth below with reference to the accompanying drawings, wherein:

FIGS. 5, 6, 7, and 9, 9a and 9b are flow charts of the operation of the control circuit of FIG. 3;

FIGS. 8A through 8F and FIGS. 10A, 10B, and 10C are timing diagrams of the operation of the control circuit of FIG. 3;

FIG. 14 is a modification of the control circuit of FIG. 3;

FIGS. 18, 18a, 18b and 18c are a block diagram of the control circuit of FIG. 16;

FIGS. 20A through 20J are timing diagrams of the operation of the control circuit of FIG. 18;

FIGS. 22a, 22b and 22c are a modification of the control circuit of FIG. 18;

FIGS. 24A through 24N are timing diagrams of the operation of the control circuit of FIG. 22.

DESCRIPTION OF THE PREFERRED EMBODIMENTS

Figure 1:
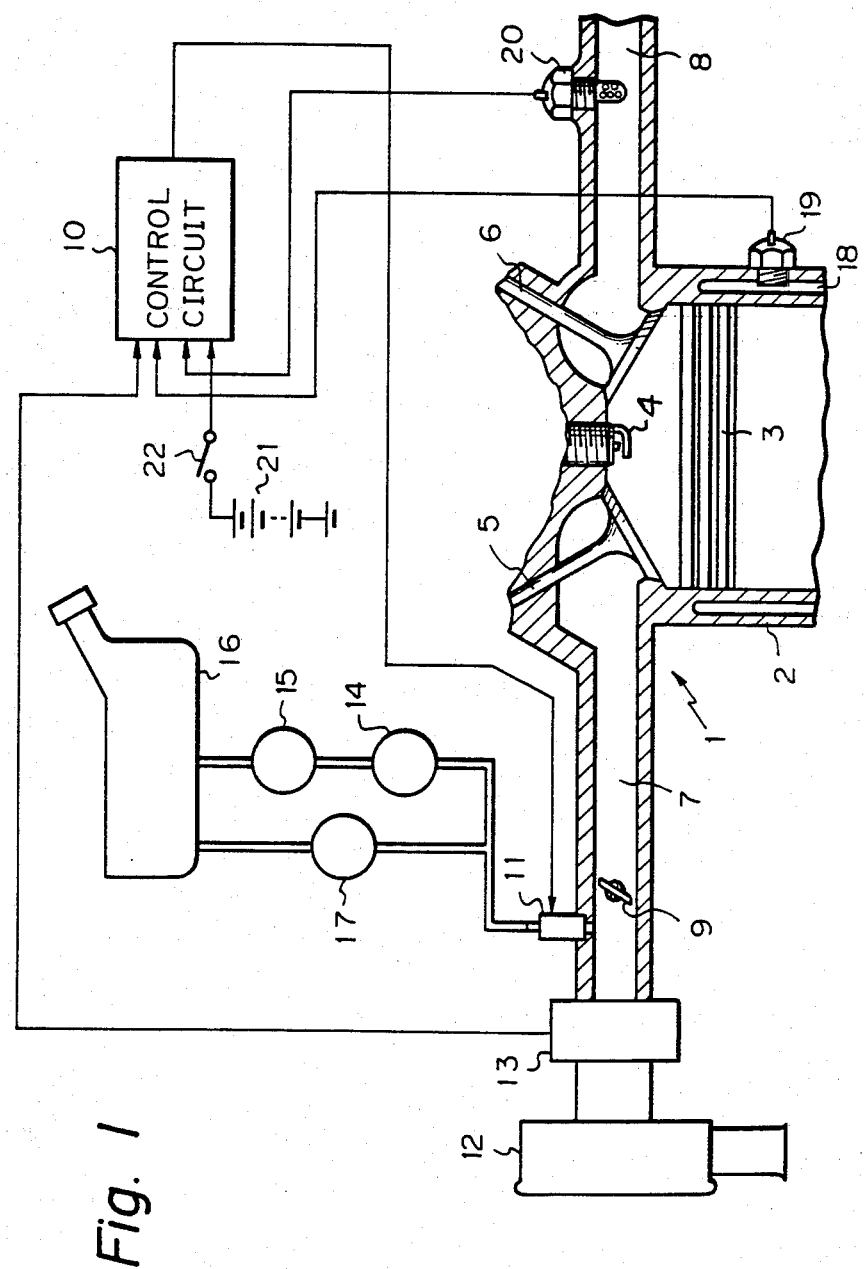
FIG. 1 is a schematic view of a spark ignition internal combustion engine including a fuel injection apparatus according to the present invention.

In FIG. 1, which is a schematic view of a spark-ignition internal combustion engine including a fuel injection apparatus according to the present invention, reference numeral 1 designates a spark ignition internal combustion engine. The engine 1 comprises a cylinder block 2, a piston 3, an ignition plug 4, an intake valve 5, an exhaust valve 6, an intake pipe 7, an exhaust pipe 8, and the like. A fuel injection apparatus 11 is provided in the wall of the intake pipe 7.

The intake pipe 7 leads to the open air via an air cleaner 12. Provided on the downstream side of the air cleaner 12 is an airflow meter 13, which may comprise a hot-wire airflow meter which generates an analog voltage in proportion to the intake air flow rate.

Fuel is supplied from a fuel tank 16 via a feed pump 14 and a filter 15. In this case, the fuel feed pressure is maintained at a definite level, such as 3 kg/cm$^2$, by a pressure regulator 17. Note, fuel spilled from the pressure regulator 17 returns to the fuel tank 16.

Provided in a water jacket 18 of the cylinder block 2 is a coolant temperature sensor 19 for detecting the cooling water temperature THW. The water temperature sensor 19 may comprise a thermistor which generates an analog voltage in proportion to the cooling water temperature THW.

Provided in the exhaust pipe 8 is an oxygen (O$_2$) sensor 20 for generating an electrical signal corresponding to the oxygen concentration in the exhaust gas. The O$_2$ sensor 20 generates a binary signal which has a value dependent upon whether the air-fuel ratio is on the lean side or on the rich side of the stoichiometric air-fuel ratio.

Note, reference numeral 21 designates a battery, and reference numeral 22 designates an ignition switch.

A control circuit 10 processes the output signals of the airflow meter 13, the coolant temperature sensor 19, the $O_2$ sensor 20, and the like to control the fuel injection apparatus 11. The control circuit 10 may comprise a microcomputer.

Figure 2:
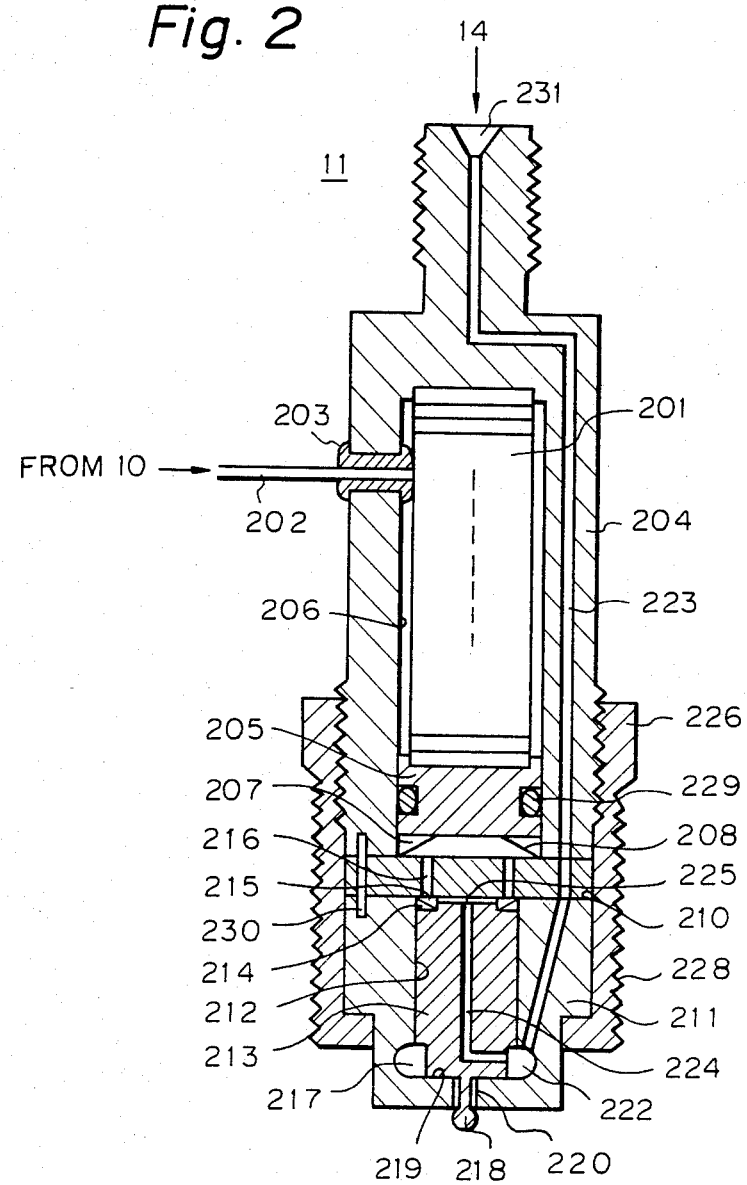
FIG. 2 is a cross-sectional view of the fuel injection apparatus 11 of FIG. 1.

The fuel injection apparatus 11 of FIG. 1 will be explained in detail with reference to FIG. 2. The fuel injection apparatus 11 is operated by the expansion/contraction of an electroexpansive actuator 201. The electroexpansive actuator 201 comprises a plurality of columnar laminated piezoelectric elements having an electroexpansive effect. Each piezoelectric element comprises a PZT ® ceramic obtained by sintering lead zirconium titanate. In the case where the piezoelectric element has a diameter of 15 mm and a thickness of 0.5 mm, when a voltage of +500 V is applied to the element, the element expands by about 0.5 μm along the axial direction of the column. Conversely, when a voltage of −500 V is applied to the element, the element contracts by about 0.5 μm. Therefore, when 100 of such elements are laminated together, 50 μm expansion/contraction can be obtained.

Formed on both surfaces of each piezoelectric element are silver electrodes. One of the silver electrodes is connected to a lead wire 202, while the other is grounded. The lead wire 202 is led to the outside of the fuel injection apparatus 11 through an upper casing 204 via a grommet 203 and is connected the control circuit 10. The expansion/contraction of the electroexpansive actuator 201 is transmitted directly to a piston 205, so that the piston 205 reciprocates.

The piston 205 slides within a cylinder 206 defined by the upper casing 204, so as to expand/reduce the volume of a fuel chamber 207. Provided in the fuel chamber 207 is a disk spring 208 for biasing the piston 205 in the contracting direction of the electroexpansive actuator 201. The weaker contracting force of the electroexpansive actuator 201 as compared with the expanding force thereof is compensated for by the disk spring 208.

The fuel chamber 207 is led to a needle cylinder 212 of a nozzle body 211 via a distance piece 210. A nozzle needle 213 slides within the needle cylinder 212. The fuel pressure of the fuel chamber 207 is applied to the upper face of the nozzle needle 213. Formed on the outer circumferential portion of the top of the nozzle needle 213 is a circular recess 214. Also provided in the circular recess 214 is a disk spring 215 for biasing the nozzle needle 213 in the down direction from the lower face of the distance piece 210.

The distance piece 210 has a plurality of fuel passages 216 along the column direction thereof communicating the fuel chamber 207 with the needle cylinder 212. The fuel passages 216 face the circular recess 214 of the nozzle needle 213 and lead to the needle cylinder 212.

Also formed in the outer circumferential portion of the bottom of the nozzle needle 213 is a circular recess 217. The nozzle needle 213 has a projection 218 at the center thereof. Reference numeral 219 designates a flat face at the lower portion of the nozzle needle 213. Provided at the center of the bottom of the needle cylinder 212 is a nozzle 220, through which the projection 218 of the nozzle needle 213 penetrates. The flat face 219 of the nozzle needle 213 is capable of closely contacting the bottom portion of the needle cylinder 212. As a result, if the flat face 219 of the nozzle needle 213 closely contacts the bottom of the needle cylinder 212, the nozzle 220 is closed. Conversely, if not, the nozzle 220 is opened.

Provided at the bottom of the needle cylinder 212 is a circular elongated fuel chamber 222 which is led to a fuel passage 223. The fuel passage 223 penetrates the nozzle body 211, the distance piece 210, and the upper casing 204. Provided in the nozzle needle 213 is a fuel passage 224 which is led to the fuel chamber 222, the nozzle needle 213 has an opening 225 at the upper portion thereof which is led to the fuel passage 224. When the upper face of the nozzle needle 213 contacts the bottom face of the distance piece 210, the opening 225 is closed.

The upper casing 204, the distance piece 210, and the nozzle body 211 are of the same diameter and are stacked in that order. These elements are pressed and secured along the axial direction in a cap-nut-like lower casing 226. In this state, a female thread of the lower casing 226 and male thread of the upper casing 204 mesh with each other. Formed at the bottom of the lower casing 226 is an opening for exposing the projection 218 and the nozzle 220. Also formed at the outer circumferential portion of the lower casing 226 is a male thread 228 for fixing the fuel injection apparatus 11 to the intake pipe 7 (FIG. 1). Reference numeral 229 designates an O-ring, 230 designates a knock pin, and 231 designates a fuel inlet provided at the upper casing 204.

The operation of the fuel injection apparatus 11 of FIG. 2 will now be explained. When a voltage of +500 V is applied to the electroexpansive actuator 201, the actuator 201 expands so as to reduce the volume of the fuel chamber 207, thereby increasing the fuel pressure thereof. This increased fuel pressure is applied to the upper face of the nozzle needle 213 so that it presses the bottom face of the needle cylinder 212. As a result, the needle 220 is cut off, thereby stopping the fuel injection. In this state, since fuel of a pressure of 3 kg/cm$^2$ is supplied via the fuel passage 223 to the fuel chamber 222, so that it applies to the entire upper face of the nozzle needle 213, the flat face 219 of the nozzle needle 213 continues to contact the bottom of the needle cylinder 212.

In the above-mentioned state, when a voltage of −500 V is applied to the electroexpansive actuator 201, the actuator 201 contracts so as to increase the volume of the fuel chamber 207, thereby lifting up the nozzle needle 213. In addition, fuel from the fuel chamber 222 is sucked up through the fuel passage 224 of the nozzle needle 213. In this case, however, since the gap between the bottom face of the distance piece 210 and the upper face of the nozzle needle 213 is about 0.2 mm and the diameter of the passage 224 is about 0.5 mm, the fuel sucked from the fuel chamber 222 is negligible. Further, in this state, the upper face of the nozzle needle 213 sticks to the bottom face of the distance piece 210, so as to cut off the opening 225 of the fuel passage 224. Therefore, a fuel pressure of 3 kg/cm$^2$ is applied to the entire bottom face of the nozzle needle 213, so that the upper face of the nozzle needle 213 continues to stick to the bottom face of the distance piece 210. Thus, fuel is injected from the needle 220.

In a fuel injection mode, the projection 218 adjusts the angle of injected fuel and prevents the needle 220 from being choked.

Figure 3:
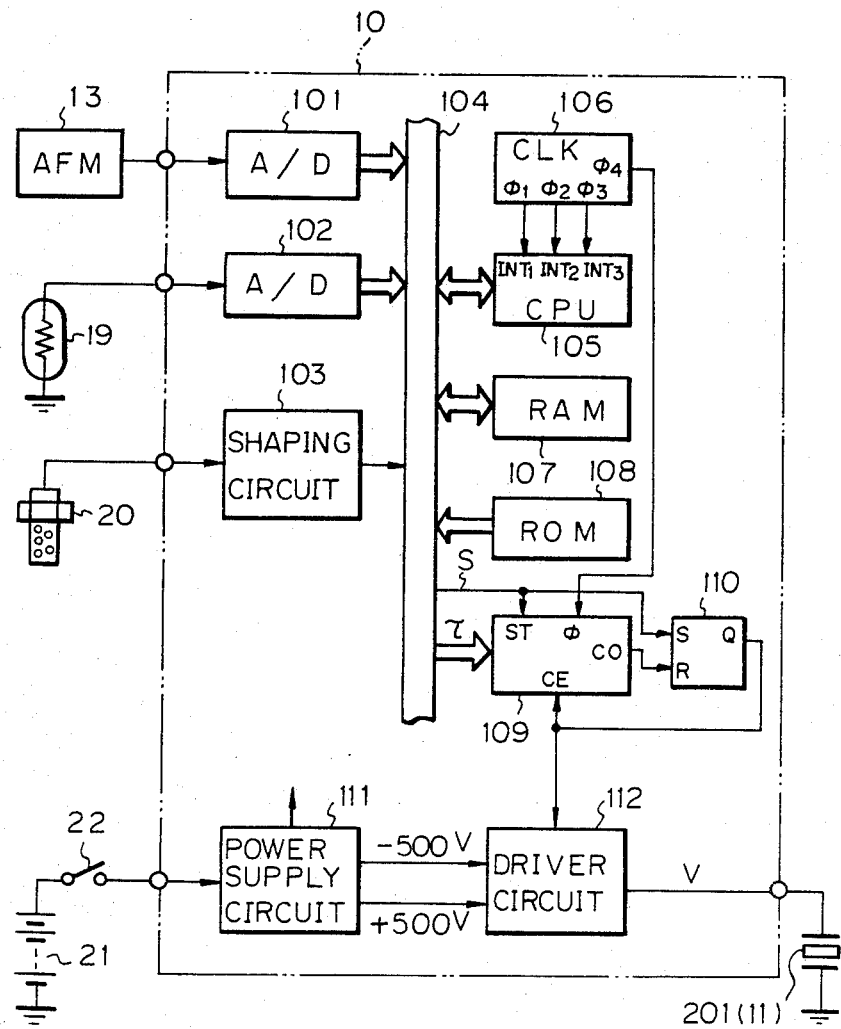
FIG. 3 is a block circuit diagram of a control circuit of FIG. 1.

The control circuit 10 of FIG. 1 will be explained with reference to FIG. 3. In FIG. 3, an analog/digital (A/D) converter 101 converts an analog output signal of the airflow meter 13 into a 16-bit digital signal which is supplied to a bus line 104. An A/D converter 102 converts an analog output signal of the coolant temperature sensor 2019 into a 16-bit digital signal, which is also supplied to the bus line 104. Note that the A/D converters 101 and 102 may comprise a single A/D converter having a multiplexing function. A wave-shaping circuit 103 may comprise a comparator, for comparing the output level of the $O_2$ sensor with a reference level, and a latch circuit, for latching the output of the comparator. That is, the wave-shaping circuit 103 generates a lean signal of level "0" when the oxygen concentration in the exhaust gas is high, while the circuit 103 generates a rich signal of level "1" when the oxygen concentration in the exhaust gas is low. Such a lean or rich signal is also supplied to the bus line 104. Note, the A/D converters 101 and 102 and the wave-shaping circuit 103 are connected to the bus line 104 via an input/output interface (not shown), which is controlled by a 16-bit central processing unit (CPU) 105.

The CPU 105 has three interrupt inputs INT1, INT2 and INT3. The priority order of interruption is INT1, INT2, and INT3. Clock signals $\phi_1$, $\phi_2$, and $\phi_3$ from a clock generating circuit 106 are supplied to the interrupt inputs INT1, INT2, and INT3, respectively. The clock signal $\phi_1$ has a frequency of 200 Hz and serves as an interrupt request signal for a fuel injection calculating routine. The clock signal $\phi_2$ has a frequency of 1 kHz and serves as an interrupt request signal for a routine for integrating an intake air amount Air. The clock signal $\phi_3$ has a frequency of several hundred Hz and serves as an interrupt request signal for a routine for calculating a fuel correction coefficient P. In addition, the clock generating circuit 106 generates a clock signal $\phi_4$ for a timer counter. Note, the phase relationship between the clock signals $\phi_1$, $\phi_2$, and $\phi_3$ is set so that these signals do not interfere with each other.

A random access memory (RAM) 107 is used for storing temporary data. A ready-only memory (ROM) 108 is used for storing a main routine, various interrupt routines, constants necessary for the routines, and the like.

Reference numeral 109 designates a down counter which has a strobe terminal ST, a clock input terminal $\phi$, a clock enable input terminal CE, and a carry-out output terminal CO. Reference numeral 110 designates a flip-flop. When a strobe signal S is supplied from the CPU 105 via one bit of the bus line 104 to the strobe terminal ST of the down counter 109, a fuel injection time period $\tau$ is preset therein. Simultaneously, the flip-flop 110 is set so as to generate a signal of level "1" from the output terminal Q thereof. Therefore, since the clock enable terminal CE becomes level "1", the down counter 109 is counted down by the clock signal $\phi_4$. When the value of the down counter 109 reaches 0, the carry-out output terminal CO becomes level "1" so that the flip-flop 110 is reset. Therefore, the clock enable terminal CE becomes level "0". As a result, the counting operation of the down counter 109 is stopped, and simultaneously, the carry-out terminal CO becomes level "1". Thus, the output Q of the flip-flop 110 remains at level "1" for the fuel injection time period $\tau$ after the generation of the strobe signal S.

Figure 4:
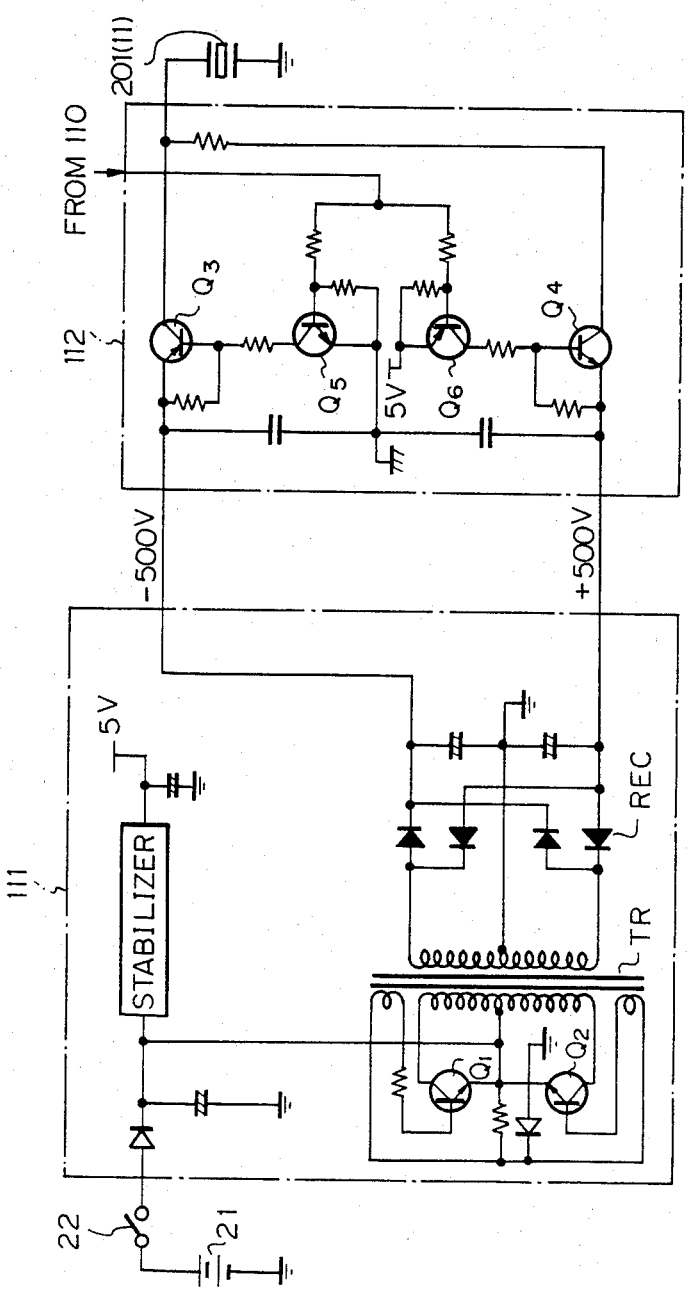
FIG. 4 is a circuit diagram of a power supply circuit and driver circuit of FIG. 3.

Reference numeral 111 designates a power supply circuit for applying a necessary power voltage to each element. The power supply circuit 111 may comprise a DC/DC converter for generating high voltages $\pm 500$ V which are applied to a driver circuit 112. As illustrated in FIG. 4, the power supply circuit 111 comprises a stabilizer and a DC/DC converter, which converter comprises transistors $Q_1$ and $Q_2$, a transformer TR for an oscillating operation, and a rectifier circuit REC. The driver circuit 112 comprises transistors $Q_3$, $Q_4$, $Q_5$, and $Q_6$, which are controlled by the output Q of the flip-flop 110. That is, when the output Q of the flip-flop 110 is at level "0", i.e., when a voltage of 0 V is applied to the bases of the transistors $Q_5$ and $Q_6$, the transistors $Q_5$ and $Q_6$ are turned off and on, respectively. Therefore, a voltage of $+500$ V is applied to the electroexpansive actuator 201 of the fuel injection apparatus 11. Similarly, when the output Q of the flip-flop 110 is at level "1", a voltage of $-500$ V is applied to the electroexpansive actuator 201.

Figure 9A:
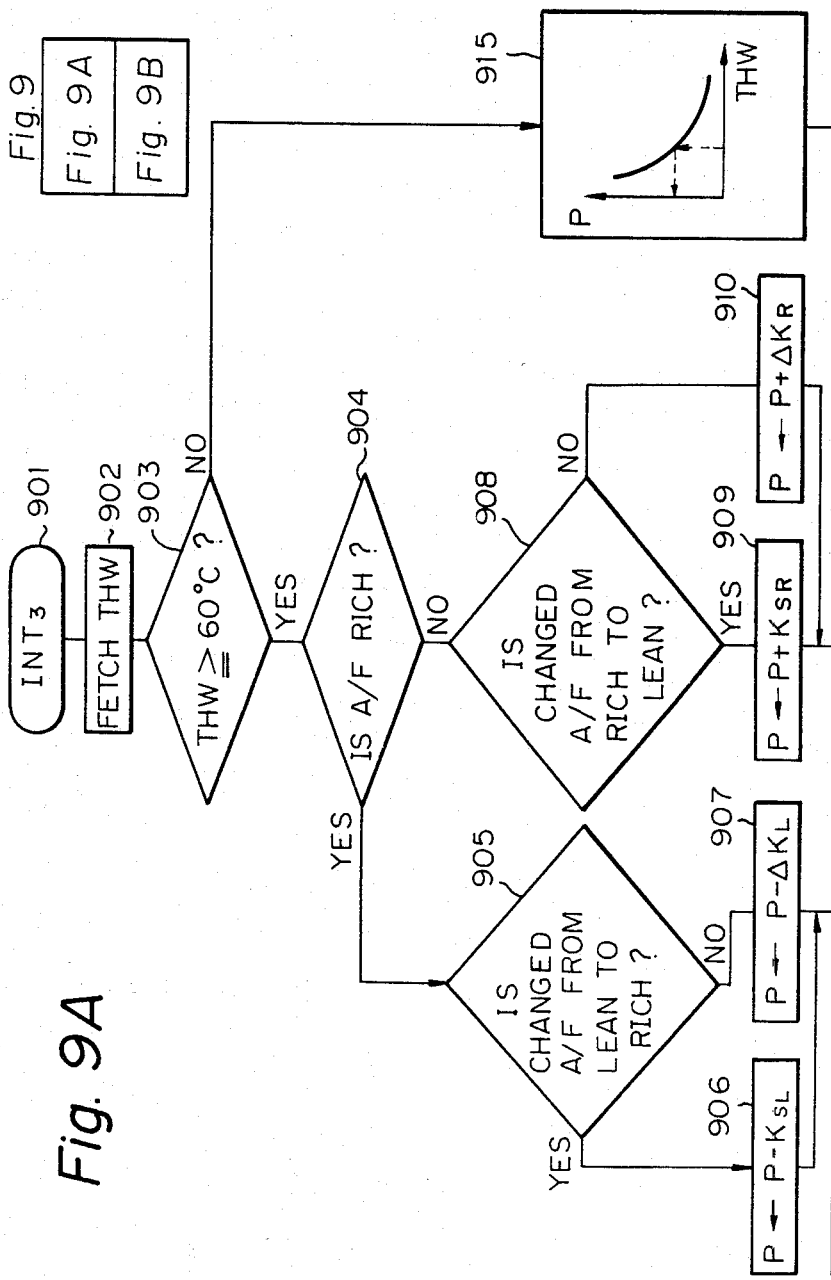
Figure 9B:
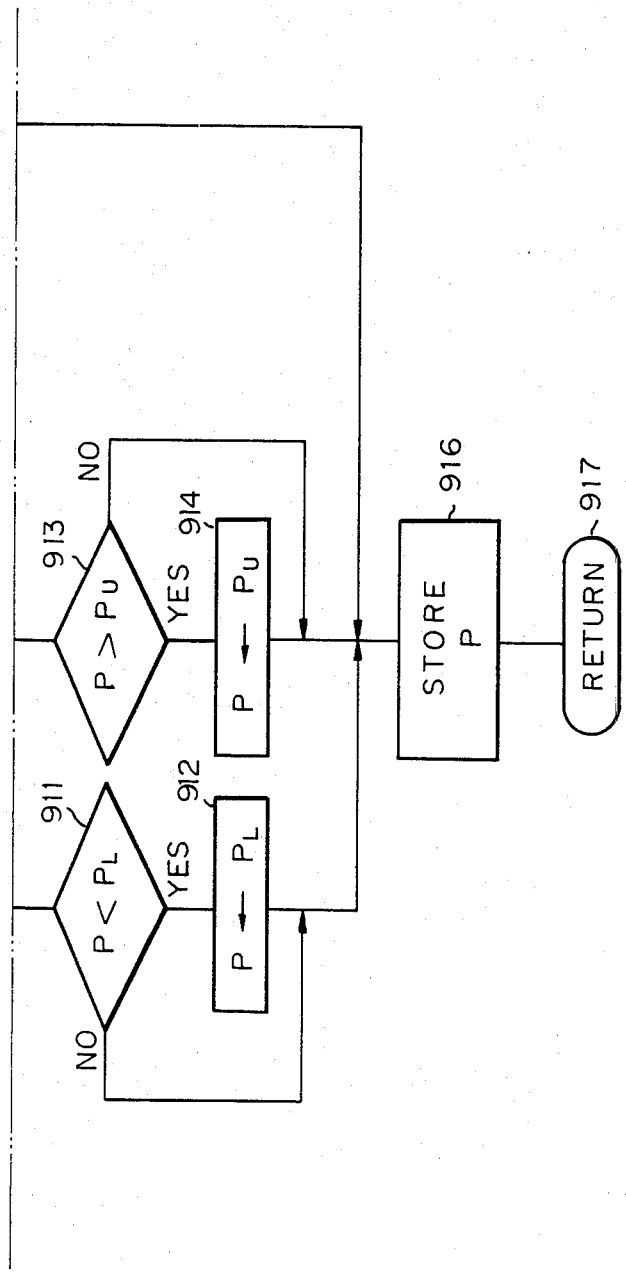

FIGS. 5, 6, 7, and 9 are flowcharts for explaining the operation of the control circuit 10 of FIG. 3. In more detail, FIG. 5 shows main routine, FIG. 6 shows a fuel injection calculating routine, FIG. 7 shows an integration calculating routine for the intake air amount Air, and FIG. 9 shows a calculating routine for the fuel correction coefficient P.

Referring to FIG. 5, when the ignition switch 22 is turned on, the battery 21 is connected to the power supply circuit 111 which, in turn, applies power voltages to the elements of the control circuit 10 such as the driver circuit 112. When the power supply circuit 111 begins to operate, step 501 is initiated. In this case, the interrupt routines are prohibited. At step 502, initialization, such as an interrupt enabling operation and preset of initial values, is carried out. Then, at step 503, the flow enters an idle loop.

Referring to FIG. 6, step 601 is started by every rise of a clock signal $\phi_1$ of 220 Hz frequency, as illustrated in FIG. 8A. At step 602, the average intake air amount $\overline{\text{Air}}$ is calculated by reading the integrated intake air amount $\Sigma\text{Air}$ and the number N of integration from the RAM 107. That is, $\overline{\text{Air}} \leftarrow \Sigma\text{Air}/N$. The reason why the average of the intake air amount is calculated is that the intake air amount pulsates in accordance with each stroke of the engine. Then, at steps 603 and 604, the values of $\Sigma\text{Air}$ and N are cleared in preparation for the next execution. At step 605, a base fuel injection time period $\tau_B$ is calculated by interpolation in accordance with a one-dimensional map stored in the ROM 108 depending upon the average $\overline{\text{Air}}$. Note this map is experimentally determined. At step 606, the CPU 105 calculates a fuel injection time period $\tau$ by:

$$\tau \leftarrow \tau_B P + \tau_V$$

where P is the fuel injection coefficient calculated by the routine of FIG. 9, and $\tau_V$ is an invalid time period. Then, at step 607, the CPU 105 sets the time period $\tau$ in the down counter 109 and, simultaneously, generates a strobe signal S. The routine of FIG. 6 is completed by step 608. Thus, fuel is injected from the fuel injection apparatus 11 to the combustion chamber of the engine 1 for the time period $\tau$.

Referring to FIG. 7, step 701 is started by every rise of a clock signal $\phi_2$ of 1 kHz frequency, as shown in FIG. 8B. At step 702, the intake air amount data Air is fetched from the airflow meter 3. At step 703, the CPU 105 calculates an integrated intake air amount $\Sigma\text{Air}$ by $\Sigma\text{Air} \leftarrow \Sigma\text{Air} + \text{Air}$. Simultaneously, at step 704, the number N of integration is counted up by $+1$. Then the routine of FIG. 7 is completed by step 705. As explained above, the values $\Sigma\text{Air}$ and N are used in the routine of FIG. 6.

FIGS. 8A through 8F show the operation of the routines of FIGS. 6 and 7. That is, the integrated value ΣAir is calculated at every rise of the clock signal $\phi_2$, as shown in FIGS. 8B and 8C, while the value ΣAir is cleared at every rise of the clock signal $\phi_1$, as shown in FIGS. 8A and 8C. Immediately before the clearing operation, the average intake air amount $\overline{Air}$ is calculated and its corresponding time period t is set in the down counter 109, which counts pulses of the clock signal $\phi_4$, as shown in FIG. 8D. As a result, a voltage of −500 V is applied to the fuel injection apparatus 11 for the time period τ, as shown in FIGS. 8E and 8F.

Referring to FIG. 9, step 901 is started by every rise of the clock signal $\phi_3$, as shown in FIG. 10A. At step 902, the coolant temperature data THW is fetched from the A/D converter 102. Then, at step 903, the CPU 105 determines whether or not THW≧60° C. If THW<60° C., the flow proceeds to step 915, in which the coefficient P is calculated by interpolation in accordance with a one-dimensional map stored in the ROM 108 depending upon the coolant temperature THW. This one-dimensional map is experimentally determined. That is, at step 915, a fuel injection amount is increased for a warming-up time period. If THW≧60° C., this means that the warming-up time period is completed, and, accordingly, the flow proceeds to step 904, which carries out an air-fuel ratio feedback operation.

At step 904, the CPU 105 fetches the output signal from the wave-shaping circuit 103 and determines whether the air-fuel mixture in the exhaust gas is rich or lean. If the air-fuel mixture is rich, the flow proceeds to step 905, wherein it is determined whether or not the air-fuel mixture is changed from the lean side to the rich side. That is, the CPU 105 determines whether or not the value of the air-fuel signal fetched in this cycle is the same as the value of the air-fuel signal fetched in the previous cycle, which value is stored in the RAM 107. If the two values are different from each other, the flow proceeds to step 906, in which P←P−$K_{SL}$, (which corresponds to time $t_1$ in FIGS. 10A, 10B, and 10C). Conversely, if the two values are the same, the flow proceeds to step 907 in which P←P−$\Delta K_L$ (which corresponds to time $t_2$ in FIGS. 10A, 10B and 10C). Here, $K_{SL}$ and $\Delta K_L$ are both definite values. The value $K_{SL}$ is considerably larger than the value $\Delta K_L$, which is, for example, 0.04/s (=0.0004/10 ms). That is, $K_{SL}>>\Delta K_L$. Similarly, at step 904, if the air-fuel mixture is lean, the flow proceeds to step 908, wherein it is determined whether or not the air-fuel mixture is changed from the rich side to the lean side. That is, the CPU 105 determines whether or not the value of the air-fuel signal fetched in this cycle is the same as the value of the air-fuel signal fetched in the previous cycle, which value is stored in the RAM 107. If the two values are different from each other, the flow proceeds to step 909 in which P←P+$K_{SR}$ (which corresponds to time $t_3$ in FIGS. 10A, 10B, and 10C). Conversely, if the two values are the same, the flow proceeds to step 910, in which P←P−$\Delta K_R$ (which corresponds to time $t_4$ in FIGS. 10A, 10B, and 10C). Here, $K_{SR}$ and $\Delta K_R$ are both definite values. The value $K_{SR}$ is considerably larger than the value $\Delta K_R$, which is, for example, 0.06/s (=0.0006/10 ms). That is $K_{SR}>>\Delta K_R$.

Note that the operation at steps 907 and 910 is a so-called integral control operation in which the fuel correction coefficient P is integrated with respect to time, and the operation at steps 906 and 909 is a so-called skip control operation for improving the converging characteristics of the fuel correction coefficient P.

The operation at steps 911 and 912 sets a lower limit $P_L$ for the coefficient P, and the operation at steps 913 and 914 sets an upper limit $P_U$ for the coefficient P. That is, when the temperature of the $O_2$ sensor 20 is low and the sensor 20 has not yet activated or when a fuel cut operation is carried out by engine braking or the like, either the rich or lean state continues for a considerably long time. In such a case, the coefficient P is limited within the range defined by the upper and lower limits $P_U$ and $P_L$. Although not shown in FIG. 9, when the rich or lean state continues over a predetermined time period, the correction coefficient P can be forcibly returned to 1.0 or another suitable value. Thus, the obtained coefficient P is stored in the RAM 107 at step 916, and the flow proceeds to step 917, thereby completing the routine of FIG. 9.

Thus, the fuel injection is carried out at every predetermined time period which has a definite frequency of, for example, 200 Hz, since the fuel injection apparatus 11 can exhibit precise and rapid response to an electrical signal. As a result, even when the rotational speed of the engine is low, the number of fuel injections per unit time is not decreased, thereby homogenizing the air-fuel mixture. This improves the response of fuel injection in an accelerating state. In addition, the fuel injection is controlled by only one parameter such as the intake air amount, which simplifies the operation of fuel injection.

Figure 11:
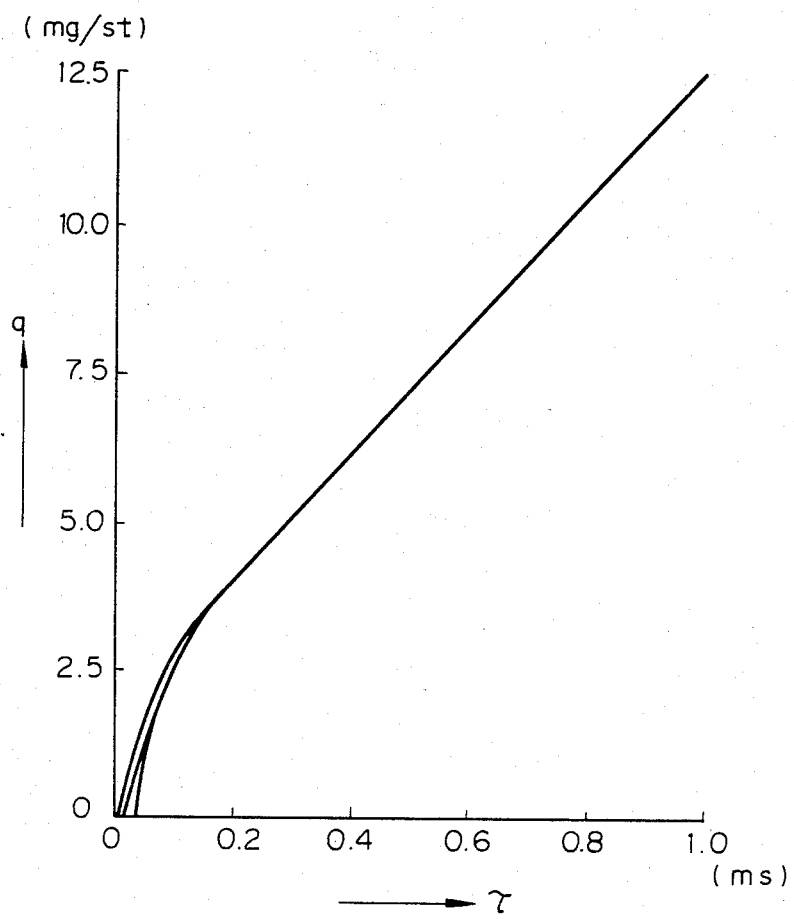
FIG. 11 is a graph of the relationship between the injection amount (mg/st) and injection time period (ms) according to the present invention.

FIG. 11 represents the relationship between the injection amount q and the injection time period τ for applying the negative voltage −500 V to the fuel injection apparatus according to the present invention. In FIG. 11, the injection time period τ (ms) is plotted along the axis of the abscissa and the injection amount q (mg/st) per one stroke is plotted along the axis of the ordinate. As shown in FIG. 11, when the injection time period τ is less than 0.2 ms, the injection amount is unstable. When the injection time period τ is not less than 0.2 ms, the injection amount q is approximately linear with respect to the injection time period τ. However, when the injection time period τ exceeds 1.0 ms, the driving frequency of the time period cannot be large. Therefore, the injection time period τ is preferably within the range from 0.2 ms to 1.0 ms.

Figure 12:
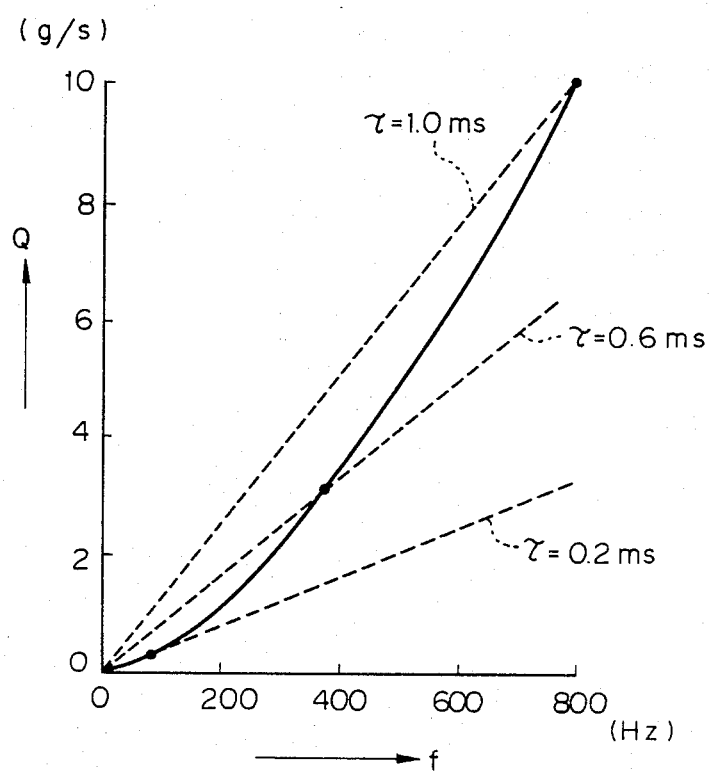
FIG. 12 is a graph of the fuel injection time period $\tau$ the relationship between the injection amount (g/s), and driving frequency (Hz) according to the present invention.

FIG. 12 represents the fuel injection time period τ, and the relationship between the injection amount Q and the driving frequency f of the fuel injection apparatus according to the present invention. In FIG. 12, the driving frequency f (Hz) is plotted along the axis of the abscissa and the injection amount Q (g/s) per second is plotted along the axis of the ordinate. Three dotted lines represent the above-mentioned relationship where the injection time period τ is 0.2 ms, 0.6 ms, and 1.0 ms, respectively. In order to change the injection amount Q smoothly, the injection time period τ and the driving frequency f are both preferably changeable. For example, the driving frequency f and the injection time period τ are controlled so as to satisfy the characteristics as illustrated by a solid line.

Figure 13A:
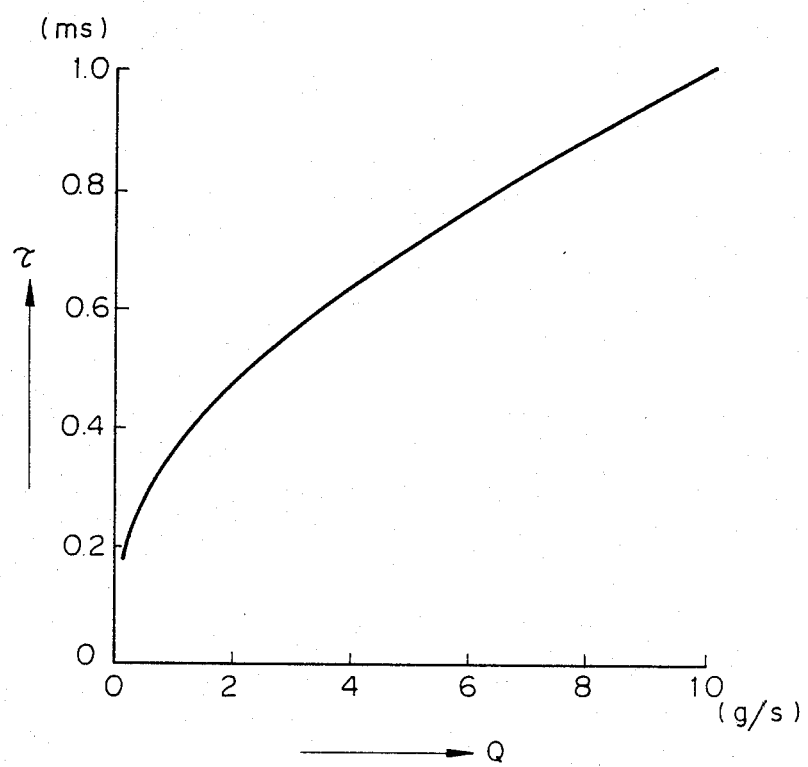
FIG. 13A is a graph of the relationship between the injection amount (g/s) and the injection time period (ms) according to the present invention.
Figure 13B:
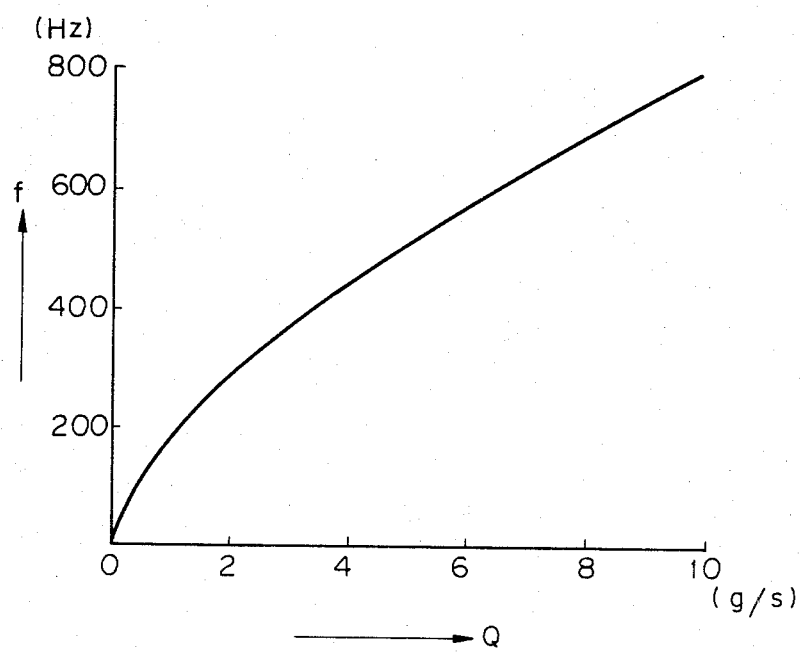
FIG. 13B is a graph of the relationship between the injection amount (g/s) and the driving frequency (Hz) according to the present invention.

In order to satisfy the characteristics of the solid line in FIG. 12, the relationship between the injection amount Q (g/s) and the injection time period τ (ms) is represented by FIG. 13A, and the relationship between the fuel amount Q (g/s) and the injection time period τ (ms) is represented by FIG. 13B.

FIG. 14 shows a modification of the control circuit 10 of FIG. 3. The control circuit 10' of FIG. 14 is used for carrying out the control operation for the characteristics as illustrated in FIGS. 13A and 13B. In FIG. 14, a latch circuit 113, a counter 114, a digital comparator 115, and a latch circuit 116 are added to the elements of the circuit of FIG. 3. The latch circuit 113 latches a driving frequency or driving time period T calculated in the CPU 105. The counter 114 receives at its reset input R a comparison output of the digital comparator 115 and at its clock input C the clock signal $\phi_4$ from the clock generator 106. The latch circuit 116 latches an injection time period $\tau$ calculated in the CPU 105.

The content of the counter 114 indicates the elapsed time t. When the elapsed time t reaches T, the digital comparator 115 resets the counter 114 and simultaneously, generates a strobe signal S, which is transmitted to the strobe terminal of the down counter 109 and to the set terminal of the flip-flop 110. As a result, the injection time period $\tau$ of the latch circuit 116 is set in the down counter 109 and the flip-flop 110 is set so as to start the injection. After the injection time period $\tau$ elapses, the down counter 109 resets the flip-flop 110, thereby completing the injection.

Figure 15:
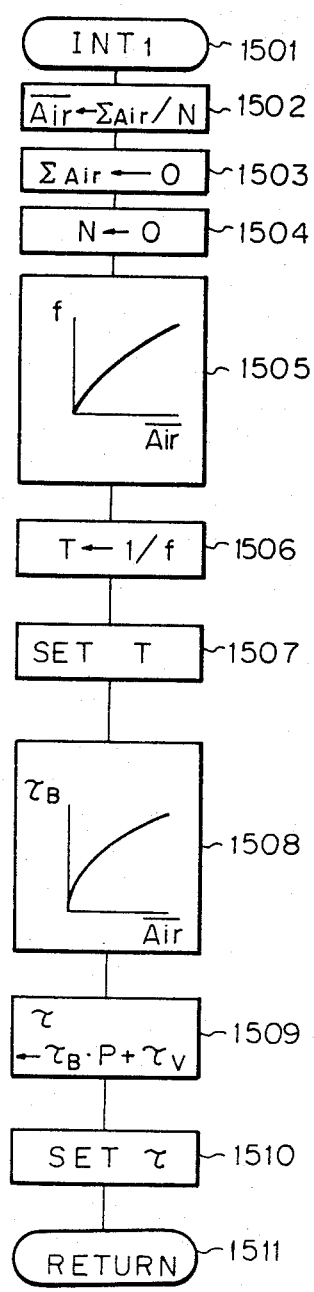
FIG. 15 is a flowchart of the operation of the control circuit of FIG. 14.

The operation of the control circuit 10' of FIG. 14 will be explained with reference to FIG. 15. Note that the operations at the routines of FIGS. 5, 7, and 9 are also carried out by the control circuit 10' of FIG. 14. That is, the control circuit 10' of FIG. 14 carries the routine of FIG. 15 instead of the routine of FIG. 6. Referring to FIG. 15, step 1501 is started by every rise of a clock signal $\phi_1$ of 200 Hz frequency as illustrated in FIG. 8A. At step 1502, the average intake air amount $\overline{Air}$ is calculated by reading the integrated intake air amount $\Sigma Air$ and the number N of integration from the RAM 107. That is, $\overline{Air} \leftarrow \Sigma Air/N$. Then, at steps 1503 and 1504, the values of $\Sigma Air$ and N are cleared in preparation for the next execution. At step 1505, a driving frequency f is calculated by interpolation in accordance with a one-dimensional map stored in the ROM 108 depending upon the average intake air amount $\overline{Air}$. Note this one-dimensional map corresponds to FIG. 13B. At step 1506, the CPU 105 converts the driving frequency f (Hz) into a driving time period T (ms), and at step 1507, the CPU 105 sets the time period T in the latch circuit 113. Then at step 1508, a base fuel injection time $\tau_B$ is calculated by interpolation in accordance with a one-dimensional map stored in the ROM 108 depending upon the average intake air amount $\overline{Air}$. Note this one-dimensional map corresponds to FIG. 13A. Then, at step 1509, the CPU 105 calculates a fuel injection time period $\tau$ by:

$$\tau \leftarrow \tau_B \cdot P + \tau_V$$

where P is the fuel injection coefficient calculated by the routine of FIG. 9, and $\tau_V$ is an invalid time period. Then at step 1509, the CPU 105 sets the time period $\tau$ in the latch circuit 109. The routine of FIG. 15 is completed by step 1511. Thus, fuel is injected from the fuel injection apparatus 11 to the combustion chamber of the engine 1 for the time period $\tau$ at a frequency f.

The fuel injection apparatus according to the present invention can also be applied to a compression-ignition internal combustion engine, i.e., a diesel engine. In such a diesel engine, a delay of compression ignition may occur in the fuel injected into the compressed air of a cylinder. This delay is increased by the following conditions:

(1) when the rotational speed of the engine is low;
(2) when the load of the engine is high;
(3) when the temperature of the coolant is low; and
(4) when the temperature of the intake air is low.

When the compression ignition is delayed, injected fuel is mixed with the compressed air. The resulting air-fuel mixture is fired simultaneously with the ignition, thereby generating a large combustion noise. To prevent the combustion noise and to improve the combustion efficiency, it is necessary to combust the injected fuel more violently toward the end of the combustion stroke. For this purpose, a slight fuel injection is carried out in advance of a main fuel injection, in view of the delay of compression ignition. Such a plurality of fuel injections per one combustion stroke are possible by using the fuel injection apparatus according to the present invention, since this fuel injection apparatus can respond precisely and rapidly to an electrical signal.

Figure 16:
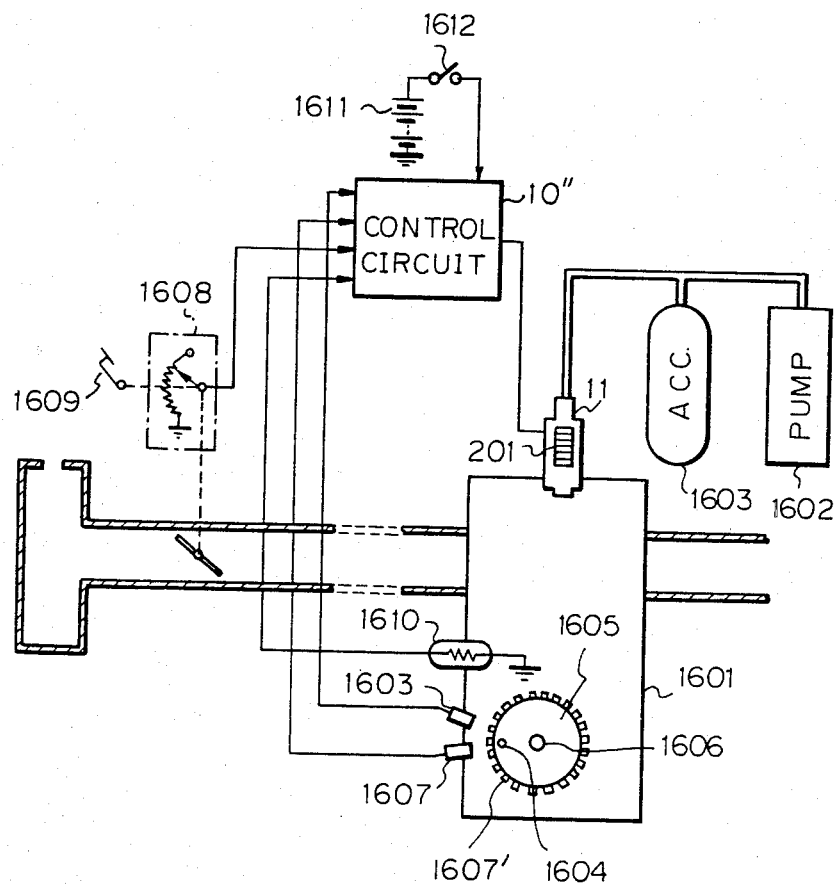
FIG. 16 is a schematic view of a compression-ignition internal combustion engine (diesel engine) including a fuel injection apparatus according to the present invention.

FIG. 16 is a schematic view of a compression-ignition engine (diesel engine) including the fuel injection apparatus according to the present invention. In FIG. 16, the fuel injection apparatus 11 is mounted on a diesel engine 1601. Reference numeral 1602 designates a high pressure pump which supplies fuel having a pressure of 200 kg/cm² to an accumulator 1603, which also supplies the fuel to the fuel injection apparatus 11.

Reference numeral 1603 designates a reference timing sensor which may comprise a magnetic pickup. The reference timing sensor 1603 detects a projection 1604 formed on a signal disk 1605 mounted on a camshaft 1606, which rotates once upon each half rotation of the engine crankshaft (not shown). The timing at which the reference timing sensor 1603 generates a reference signal is set at a 30° crank angle before the top dead center of each cylinder (30° CA BTDC). Thus, the reference timing sensor 1603 generates or reference timing signal per 180° CA.

Reference numeral 1607 designates a crank angle sensor, which also may comprise a magnetic pickup. This crank angle sensor 1607 detects projections 1607' formed on the signal disc 1605. In this case, the number of the projections 1607' is 180. Therefore, the crank angle sensor 1607 generates one crank angle signal per 1° CA.

Reference numeral 1608 designates a load sensor, which may comprise a potentiometer interlocked with an acceleration pedal 1609. This load sensor 1608 generates an analog voltage signal corresponding to the opening $\theta_{ACC}$ of the acceleration pedal 1609.

Reference numeral 1610 designates a coolant temperature sensor, which is the same as the sensor 19 of FIG. 1. Note an intake air temperature sensor can be used instead of the coolant temperature sensor 1610. Reference numerals 1611 and 1612 designate a battery and a key switch, respectively.

A control circuit 10'' processes the output signals of the sensors 1603, 1607, 1608, and 1610 to control the fuel injection apparatus 11.

Figure 17:
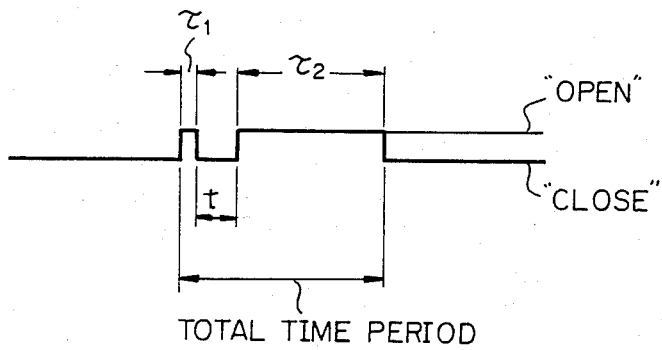
FIG. 17 is a timing diagram of the operation of a control circuit of FIG. 16.

The operation of the control circuit 10'' of FIG. 16 will be briefly explained with reference to FIG. 17. First, a suitable fuel injection amount q (mg/st) and a suitable injection timing (μs) are calculated in accordance with the rotational speed Ne (rpm) from the crank angle sensor 1607, the acceleration opening $\theta_{ACC}$ from the load sensor 1608, and the coolant temperature THW (°K.) from the coolant temperature sensor 1610. In addition, the injection fuel amount q is converted into an injection time period $\tau$, which is split into first and second time periods $\tau_1$ and $\tau_2$. That is, $$\tau = \tau_1 + \tau_2 \quad (1)$$

where $\tau_1$ is a definite value such as 30 μs. Inserted between the injection time periods $\tau_1$ and $\tau_2$ is an injection suspension time period t, which is given by:

$$t = m/Ne \cdot q \cdot THW \quad (2)$$

where m is a constant such as $2.5 \times 10^6$ (ms·rpm·mg/st·°K.) For example, when Ne=600 rpm, q=7 mg/st, and THW=273° K., t equals 1.69 ms. In addition, when q=7 mg/st, the suitable injection time period $\tau$ equals 200 μs. Therefore, in this case, $\tau_1 = 30$ μs
$t = 1.69$ ms
$\tau_2 = 170$ μs.

Thus, the presence of the injection suspension time period t enables the compression ignition to be carried out by the slight fuel amount defined by $\tau_1$ and the main fuel amount defined by $\tau_2$ to be injected after the compression ignition, thereby avoiding large combustion noise.

Note that when the injection suspension time period t is less than about 0.2 ms, this time period can be cancelled, since, in this case, the delay of compression ignition is very small so that no noise problem occurs due to the combustion of the air-fuel mixture. For example, when Ne=2000 rpm, q=15 mg/st, and THW=353° K., the injection suspension time period t equals 0.24 ms. This time period can be cancelled.

The control circuit 10″ of FIG. 16 will be explained with reference to FIG. 18. The output reference timing sensor 1603 is supplied to a wave-shaping circuit 1801 which, in turn, generates a one-bit digital signal per 180° CA, as shown in FIG. 20A. The output signal of the crank angle sensor 1607 is supplied to a wave-shaping circuit 1802, which, in turn, generates a one-bit digital signal per 1° CA as shown in FIG. 20B. The analog output signal of the load sensor 1608 is supplied to an A/D converter 1803, which, in turn, generates a 16-bit digital signal. The analog ouput signal of the coolant temperature sensor 1610 is supplied to an A/D converter 1804, which, in turn, generates a 16-bit digital signal. Both the 16-bit digital signals of the A/D converters 1803 and 1804 are supplied to a bus line 1805.

Reference numeral 1806 designates a 16-bit rotational speed counter, and 1807 designates a latch circuit. The counter 1806 counts up a clock signal $\phi'_1$ having a frequency of 100 kHz from a clock generator 1808 and is reset by the 180° CA signal of the wave-shaping circuit 1801. When the counter 1806 is reset by the 180° CA signal, the content of the counter 1806 is latched by a latch circuit 1807. Therefore, the latch circuit 1807 generates a digital signal corresponding to the time period $T_N$ of the rotational speed of the engine 1601. This digital signal is supplied to the bus line 1805.

A 16-bit angle counter 1809 counts up the 1° CA signal from the wave-shaping circuit 1802 and is reset by the 180° CA signal from the wave-shaping circuit 1801. Therefore, the content $\phi$ of the counter 1809 represents the rotational angle of the engine 1601. A 16-bit latch circuit 1810 latches a rotational angle $\phi_i$ corresponding to an injection start timing, which is calculated by a CPU 1823. A digital comparator 1811 compares the output signal $\phi$ of the angle counter with the content $\phi_i$ of the latch circuit 1810. When $\phi$ reaches $\phi_i$, the comparator 1811 generates a "1" level signal as shown in FIG. 20C, thereby triggering a one-shot multivibrator 1812.

When the one-shot multivibrator 1812 is triggered by the comparator 1811, the one-shot multivibrator 1812 generates a rectangular signal having the above-mentioned first injection time period $\tau_1$, such as 30 μs, as shown in FIG. 20D.

A 16-bit counter 1813 counts up a clock signal $\phi_2$ having a frequency of 1 MHz from the clock generator 1808 and is reset by the output signal of the one-shot multivibrator 1812. Therefore, the content $T_1$ of the counter 1813 represents the elapsed time after the one-shot multivibrator 1812 completes its output. A 16-bit latch circuit 1814 latches an injection suspension time period t calculated by the CPU 1823. A digital comparator 1815 compares the output $T_1$ of the counter 1813 with the content t of the latch circuit 1814. When $T_1$ reaches t, the comparator 1815 generates a "1" level signal as shown in FIG. 20E. This "1" level signal is supplied to a 16-bit counter 1816 and to a flip-flop 1819, thereby setting it.

The counter 1816 counts up the clock signal $\phi_2$ having the freqency of 1 MHz from the clock generator 1808 and is reset by the output signal of the comparator 1815. Therefore, the content $T_2$ of the counter 1816 represents the elapsed time after the comparator 1815 generates the "1" level signal as shown in FIG. 20E. A 16-bit latch circuit 1817 latches a second injection time period $\tau_2$ calculated by the CPU 1823. A digital comparator 1818 compares the output $T_2$ of the counter 1816 with the content $\tau_2$ of the latch circuit 1817. When $T_2$ reaches t, the comparator 1818 generates a "1" level signal as shown in FIG. 20F. This "1" level signal is supplied to the flip-flop 1819, thereby resetting it.

The flip-flop 1819 is set by the output signal ($T_1 = t$) of the comparator 1815 and is reset by the output signal ($T_2 = \tau_2$) of the comparator 1818. Therefore, the output signal FF of the flip-flop 1819 is as shown in FIG. 20G.

The output signal of the one-shot multivibrator 1812 and the output signal of the flip-flop 1819 are supplied to an OR circuit 1820 which, therefore, generates a waveform OR as shown in FIG. 20H.

A power supply circuit 1821 and a driver circuit 1822 are the same as the power supply circuit 111 and the driver circuit 112, respectively. A RAM 1824 and a ROM 1825 correspond to the RAM 107 and the ROM 108, respectively.

When the output signal of the flip-flop 1820 is at the "1" level, the driver circuit 1822 applies a voltage of −500 V to the electroexpansive actuator 201 of the fuel injection apparatus 11, thereby closing it. Contrary to this, when the output signal of the flip-flop 1820 is at the "0" level, the driver circuit 1822 applies a voltage of +500 V to the electroexpansive actuator 201 of the fuel injection apparatus 11, thereby opening it. As a result, the injection state of the fuel injection apparatus 11 is as shown in FIG. 20J.

Note that each of the counters 1809, 1813, and 1816 has a maximum value even when counting pulses. Therefore, the counters never overflow before receiving a reset signal.

The operation of the control circuit 10″ of FIG. 18 will be explained with reference to the routine of FIG. 19. Note that when the key switch 1612 is turned on, a main routine similar to that of FIG. 5 is also carried out by the control circuit 10″.

Figure 19:
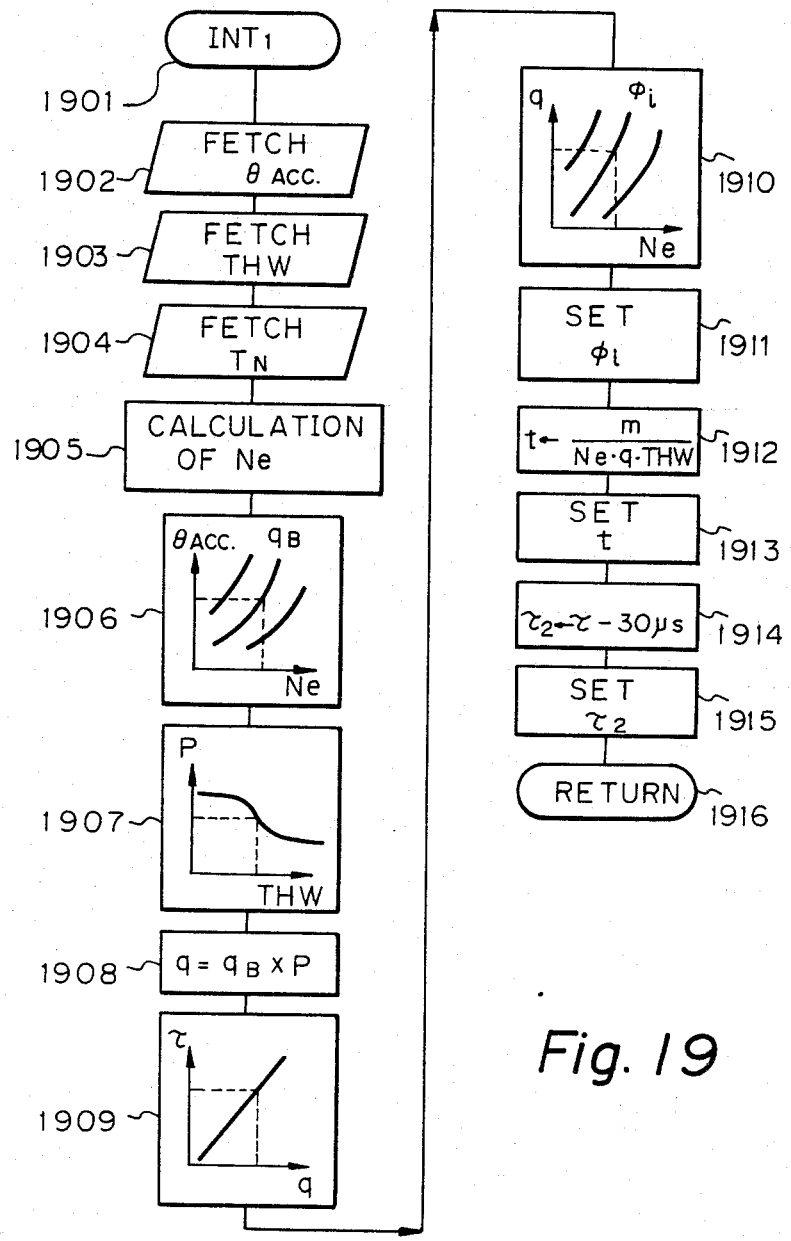
FIG. 19 is a flowchart of the operation of the control circuit of FIG. 18.

In FIG. 19, step 1901 is started every rise of the 180° CA output signal of the wave-shaping circuit 1801, as shown in FIG. 20A. At step 1902, the acceleration opening $\theta_{ACC}$ is fetched from the A/D converter 1803. At step 1903, the CPU 1823 fetches the coolant temperature THW from the A/D converter 1803. Then, at step 1904, the CPU 1823 fetches the rotational time period $T_N$ from the latch circuit 1810.

At step 1905, the rotational speed Ne of the engine 1601 is calculated in accordance with the fetched time period $T_N$. That is, Ne←a/$T_N$, where a is a constant.

At step 1906, a base injection amount $q_B$ is calculated by interpolation in accordance with a predetermined two-dimensional map depending upon the rotatinal speed Ne and the acceleration opening $\theta_{ACC}$.

At step 1907, a fuel correction coefficient P is calculated by interpolation in accordance with a predetermined one-dimensional map depending upon the coolant temperature THW.

At step 1908, a fuel injection amount q is calculated. That is, q←$q_B$·P. Then, at step 1909, the fuel injection amount q is converted into a corresponding fuel injection time period $\tau$.

At step 1909, a start rotational angle $\phi_i$ corresponding to a start injection timing is calculated by interpolation in accordance with a predetermined two-dimensional map depending upon the rotational speed Ne and the injection time period $\tau$. Then, at step 1911, the CPU 1923 sets the start rotational angle $\phi_i$ in the latch circuit 1810.

At step 1912, an injection suspension time period t is calculated by using the above-mentioned formula (2). That is, $$t \leftarrow m/Ne \cdot q \cdot THW.$$

Then, at step 1913, the CPU 1823 sets the time period t in the latch circuit 1814. Note the intake air temperature THA can be used instead of the coolant temperature THA. At step 1914, a second fuel injection time period $\tau_2$ is calculated by $\tau_2 \leftarrow \tau - 30$ μs. Then, at step 1915, the CPU 1823 sets the second injection time period $\tau_2$ in the latch circuit 1817.

The routine of FIG. 19 is completed by step 1916.

When the three values $\phi_i$, t, and $\tau_2$ are set in the latch circuits 1810, 1814, and 1817, respectively, by the routine of FIG. 19, the operation as illustrated in FIGS. 20A through 20J is automatically arried out, as set forth below.

At time $t_1$, when the routine of FIG. 19 is carried out, the angle counter 1809 is reset by the output signal of the wave-shaping circuit 1801, as shown in FIG. 20A, and counts up the output signal of the wave-shaping circuit 1802, as shown in FIG. 20B.

At time $t_2$, when the content $\phi$ of the angle counter 1809 reaches the content $\phi_i$ of the latch circuit 1810, the angle comparator 1811 generates a pulse signal as shown in FIG. 20C. As a result, the one-shot multivibrator 1812 generates a rectangular signal as shown in FIG. 20D and accordingly, the output OR of the OR circuit 1820 becomes the "1" level, as shown in FIG. 20H, thereby starting the first injection time period $\tau_1$.

At time $t_3$, when the one-shot multivibrator 1812 terminates its output signal as shown in FIG. 20D, the output OR of the OR circuit 1820 becomes the "0" level, as shown in FIG. 20H, thereby ending the first injection time period $\tau_1$. Simultaneously, the counter 1813 is reset to restart the counting of the clock signal $\phi'_2$.

At time $t_4$, when the content T of the counter 1813 reaches the content t of the latch circuit 1814, the comparator 1815 generates a pulse signal as shown in FIG. 20E. As a result, the flip-flop 1819 is set so that the output FF of the flip-flop 1819 becomes "1" level, as shown in FIG. 20G, and, accordingly, the output OR of the OR circuit 1820 also becomes the "1" level, as shown in FIG. 20H, thereby starting the seocnd injection time period $\tau_2$. Simultaneously, the counter 1816 is reset to restart the counting of the clock signal $\phi'_2$.

At time $t_5$, when the content $T_2$ of the counter 1816 reaches the content $\tau_2$ of the latch circuit 1817, the comparator 1818 generates a pulse signal as shown in FIG. 20F. As a result, the flip-flop 1819 is reset so that the output FF of the flip-flop 1819 becomes the "0" level, as shown in FIG. 20G, and, accordingly, the output OR of the OR circuit 1820 also becomes the "0" level, as shown in FIG. 20H, thereby ending the second injection time period $\tau_2$.

The driver circuit 1822 receives the output signal OR of the OR circuit 1820, as shown in FIG. 20H. Therefore, the driver circuit 1822 applies a voltage signal as shown in FIG. 20I to the electroexpansive actuator 201 of the fuel injection apparatus 11 of FIG. 16.

Figure 21:
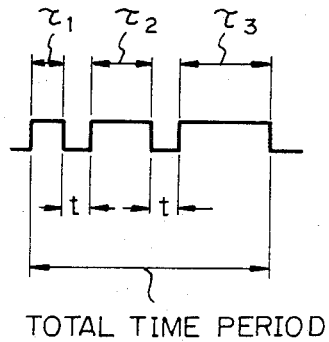
FIG. 21 is another timing diagram of the operation of the control circuit of FIG. 16.

Three fuel injections per one combustion stroke can be carried out by using the fuel injection apparatus according to the present invention. For example, as illustrated in FIG. 21, the injection time period $\tau$ is split into three time periods $\tau_1$, $\tau_2$, and $\tau_3$. That, is,
$\tau = \tau_1 + \tau_2 + \tau_3$
where $\tau_1 = \tau/6$
$\tau_2 = \tau/3$
$\tau phd\ 3 = \tau/2$.
In other words, $\tau_1 : \tau_2 : \tau_3 = 1 : 2 : 3$. In addition, an injection suspension time period t is determined by:

$$t = n/Ne$$

where n is a constant such as 900 ms·rpm.

Thus, if the condition $\tau_1 < \tau_2 < \tau_3$ is satisfied, the combustion of fuel becomes more violent toward the end of the stroke, thereby avoiding combusting noise and improving combustion efficiency.

For example, when the rotational speed Ne is 600 rpm, the injection suspension time period t is 1.5 ms. In addition, in a full load mode where the fuel injection amount q is 42 mg/st,
$\tau = 1.2$ ms
$\tau_1 = 0.2$ ms
$\tau_2 = 0.4$ ms
$\tau_3 = 0.6$ ms.
Thus, the total injection time period from the start of the first injection to the end of the third injection is 4.2 ms ($= \tau_1 + t + \tau_2 + t + \tau_3$).

Contrary to the above, when the rotational speed Ne is 4000 rpm and the fuel injection amount q is 42 mg/st, the above-mentioned total injection time period is 1.63 ms. That is, the total injection time period during a low rotational speed mode is remarkably larger than that during a high rotational speed mode, thereby improving the efficiency of use of intake air.

Figure 18B:
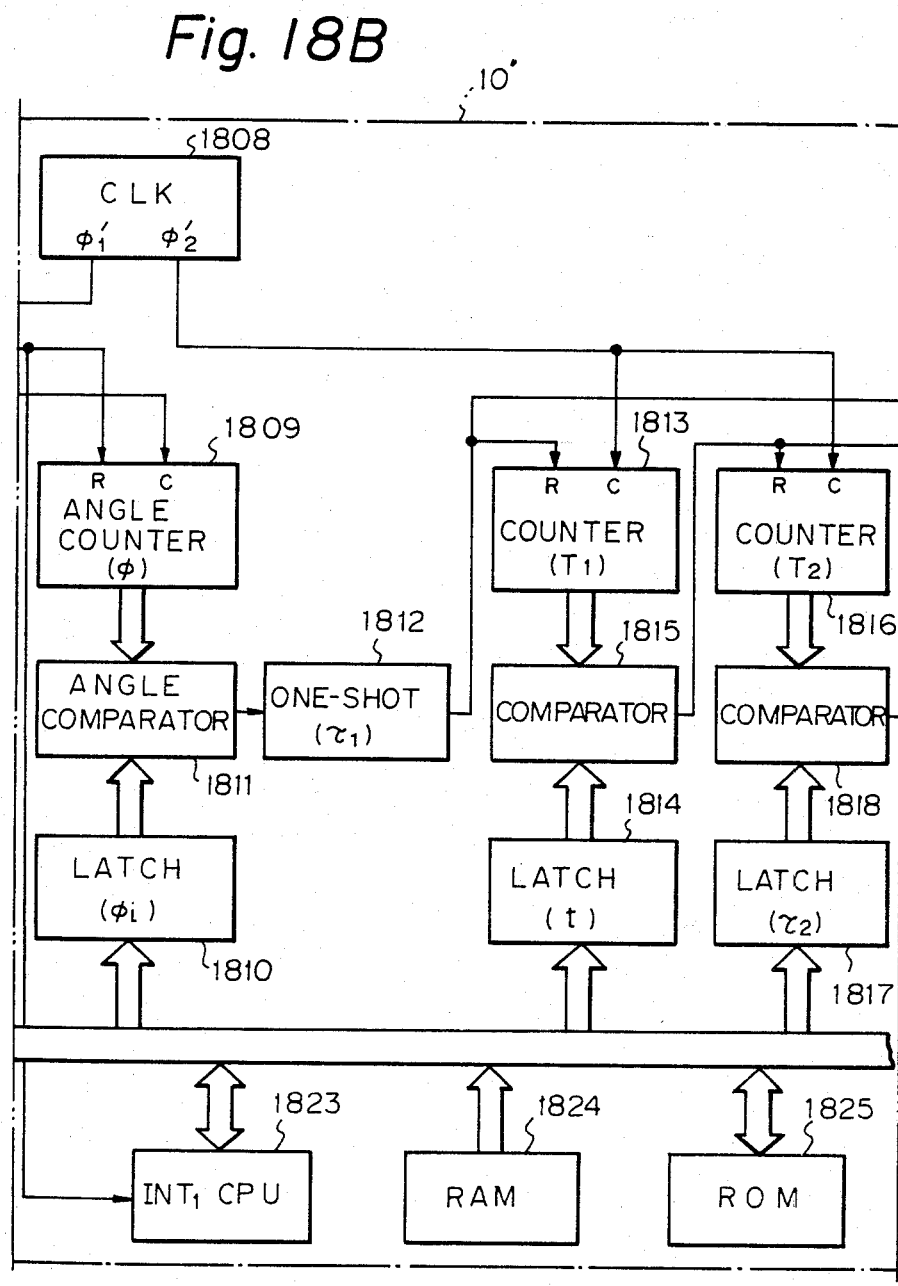
Figure 22B:
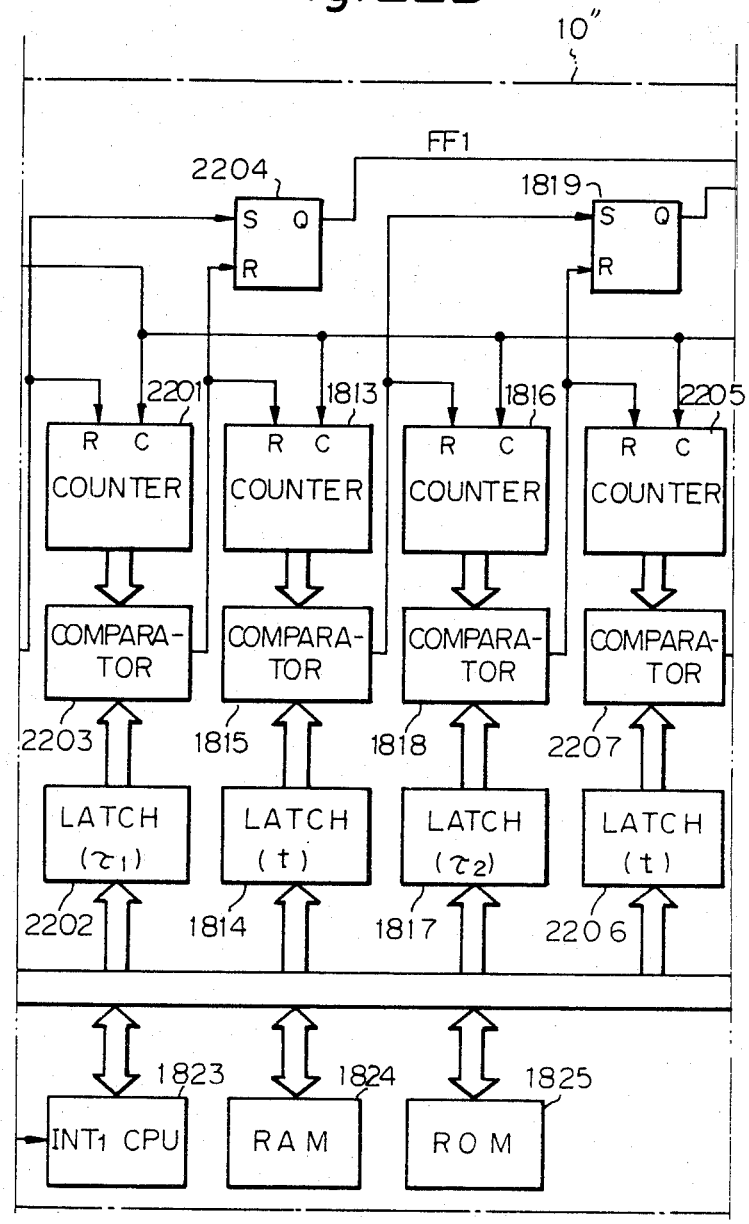
Figure 22C:
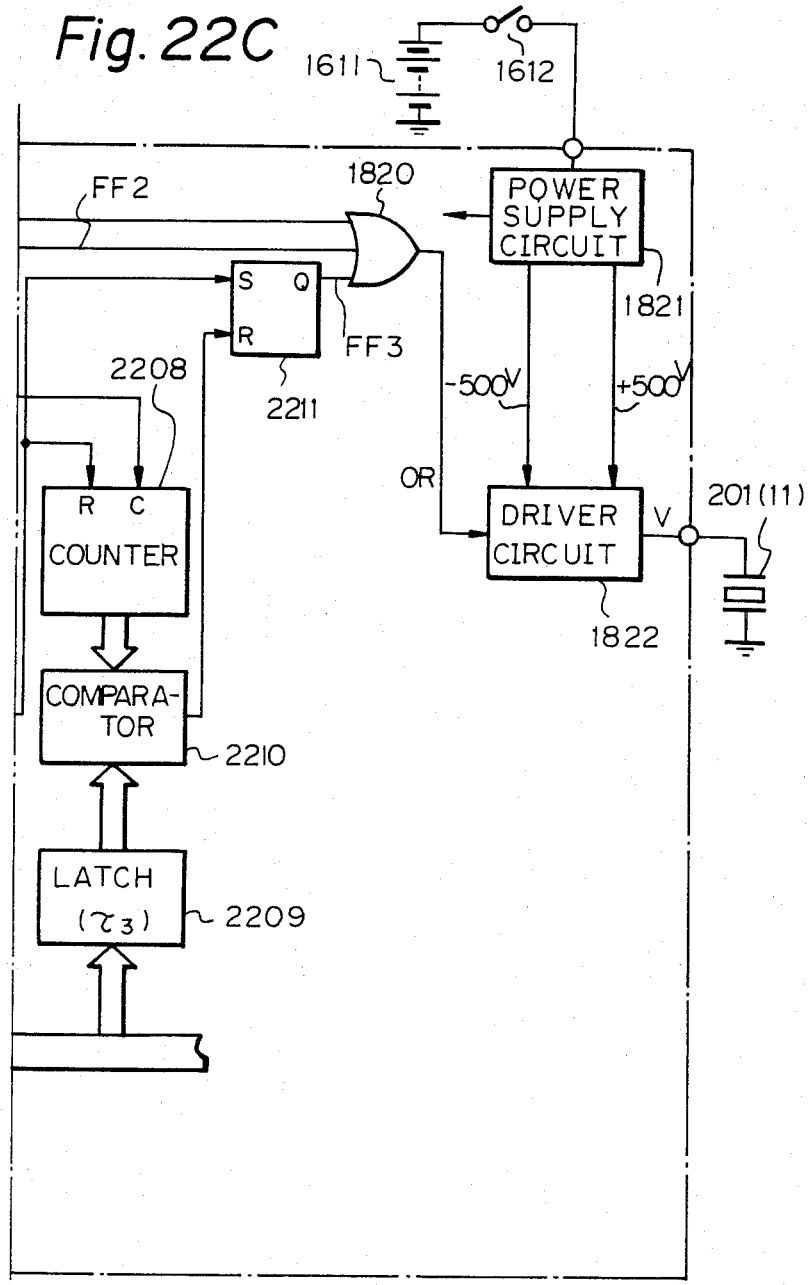

FIG. 22 is a modification of the control circuit 10" of FIG. 18. The control circuit 10''' of FIG. 22 is used for carrying out three fuel injections per one combustion stroke.

In FIG. 22, a 16-bit counter 2201, a 16-bit latch circuit 2202, a digital comparator 2203, and a flip-flop 2204 are provided instead of the one-shot multivibrator 1812 of FIG. 18, since the first injection time period $\tau_1$ is variable according to the injection amount q(τ). In addition, the elements 2205 through 2211 are added to those of FIG. 18. In more detail, the 16-bit counter 2205, the 16-bit latch circuit 2206, and the digital comparator 2207 are provided for the second injection suspension time period t. The 16-bit counter 2208, the 16-bit latch circuit 2209, and the digital comparator 2210 are provided for the third injection time period $\tau_3$. The flip-flop 2211 is set by the output signal of the comparator 2207 and is reset by the output signal of the comparator 2210.

Note that the counters 2201, 2205, and 2208 are the same type as the counters 1813 and 1816.

The operation of the control circuit 10''' of FIG. 22 will be explained with reference to the routine of FIG. 23. Also in this case, note that when the key switch 1612 is turned on, a main routine similar to that of FIG. 5 is carried out by the control circuit 10''.

Figure 23:
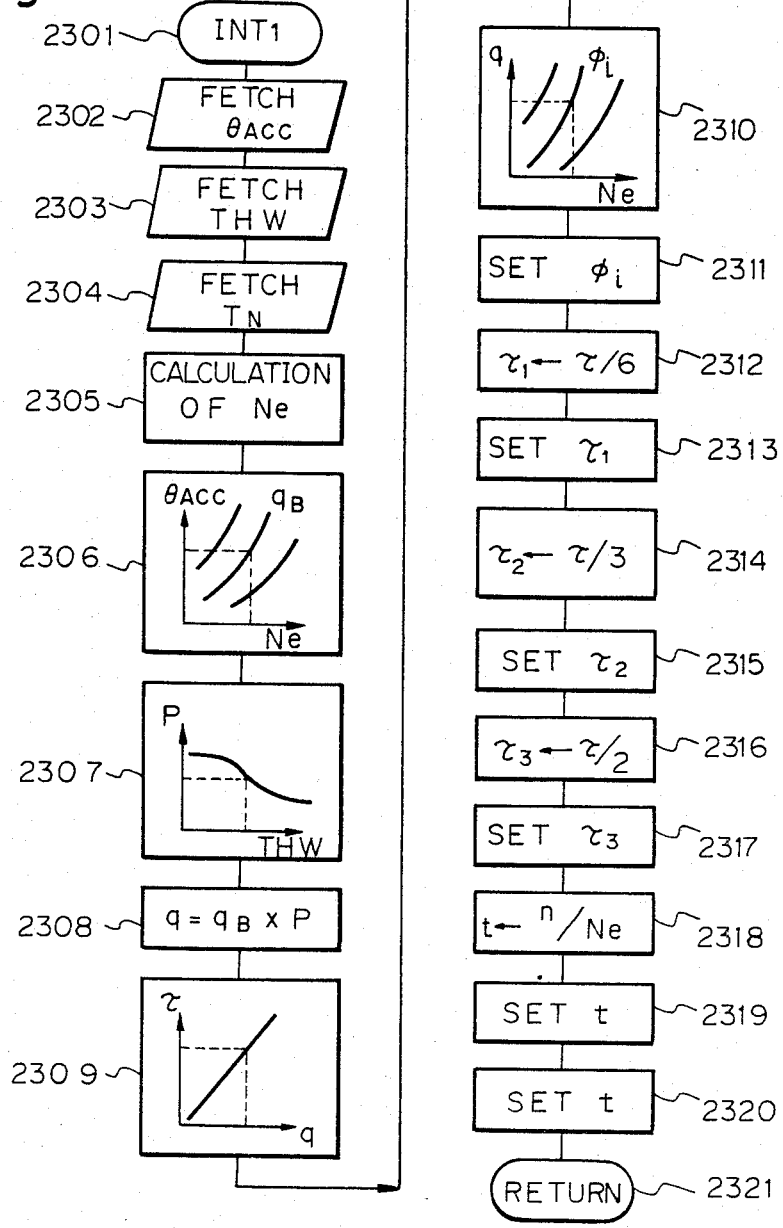
FIG. 23 is a flow chart of the operation of the control circuit of FIG. 22.

In FIG. 23, the steps 2301 through 2311 are the same as the steps 1901 through 1911, respectiely, of FIG. 19. At step 2312, the first injection time period $\tau_1$ is calculated by $\tau_1 \leftarrow \tau/6$. Then, at step 2313, the CPU 1823 sets the calculated first injection time period $\tau_1$ in the latch circuit 1810. At step 2314, the second injection time period $\tau_2$ is calculated by $\tau_2 \leftarrow \tau/3$. Then, at step 2315, the CPU 1823 sets the calculated second injection time period $\tau_2$ in the latch circuit 1817. At step 2316, the third injection time period $\tau_3$ is calculated by $\tau_3 \leftarrow \tau/2$. Then, at step 2317, the CPU 1823 sets the calculated third injection time period $\tau_3$ in the latch circuit 2209. At step 2318, the CPU 2318 calculates an injection suspension time period t by $t \leftarrow n/Ne$. Then, at steps 2319 and 2320, the CPU 2318 sets the injection suspension time period t in the latch circuits 1814 and 2206.

The routine of FIG. 23 is completed by step 2321.

When the values $\phi_i$, $\tau_1$, t, $\tau_2$, t, and $\tau_3$ are set in the latch circuits 1810, 2202, 1814, 1817, 2206, and 2209, respectively, by the routine of FIG. 23, the operation as illustrated in FIGS. 24A through 24N is automatically carried out, as set forth below.

At time $t_1$, when the routine of FIG. 23 is carried out, the angle counter 1809 is reset by the output signal of the wave-shaping circuit 1801, as shown in FIG. 24A, and counts up the output signal of the wave-shaping circuit 1802, as shown in FIG. 24B.

At time $t_2$, when the content $\phi$ of the angle counter 1809 reaches the content $i$ of the latch circuit 1810, the angle comparator 1811 generates a pulse signal as shown in FIG. 23C. As a result, the flip-flop 2204 is set so that the output FF1 of the flip-flop 2204 becomes "1" level, as shown in FIG. 23I, and, accordingly, the output OR of the OR circuit 1820 also becomes the "1" level, as shown in FIG. 23L, thereby starting the first injection time period $\tau_1$. Simultaneously, the counter 2201 is reset to restart the counting of the clock signal $\phi'_2$.

At time $t_3$, when the content of the counter 2201 reaches the content $\tau_1$ of the latch circuit 2202, the comparator 2203 generates a pulse signal as shown in FIG. 23D. As a result, the flip-flop 2204 is reset so that the output FF1 of the flip-flop 2204 becomes the "0" level as shown in FIG. 23I, and, accordingly, the output OR of the OR circuit 1820 also becomes the "0" level as shown in FIG. 23L, thereby ending the first injection time period $\tau_1$. Simultaneously, the counter 1813 is reset to restart the counting of the clock signal $\phi'_2$.

At time $t_4$, when the content of the counter 1813 reaches the content t of the latch circuit 1814, the comparator 1815 generates a pulse signal as shown in FIG. 23E. As a result, the flip-flop 1819 is set so that the output FF2 of the flip-flop 1819 becomes "1" level, as shown in FIG. 23J, and, accordingly, the output OR of the OR circuit 1820 also becomes the "1" level, as shown in FIG. 23L, thereby starting the second injection time period $\tau_2$. Simultaneously, the counter 1816 is reset to restart the counting of the clock signal $\phi'_2$.

At time $t_5$, when the content of the counter 1816 reaches the content $\tau_2$ of the latch circuit 1817, the comparator 1818 generates a pulse signal as shown in FIG. 23F. As a result, the flip-flop 1819 is reset so that the output FF2 of the flip-flop 1819 becomes the "0" level, as shown in FIG. 23J, and, accordingly, the output OR of the OR circuit 1820 also becomes the "0" level as shown in FIG. 23L, thereby ending the second injection time period $\tau_2$. Simultaneously, the counter 2205 is reset to restart the counting of the clock signal $\phi'_2$.

At time $t_6$, when the content of the counter 2205 reaches the content ti of the latch circuit 2206, the comparator 2207 generates a pulse signal as shown in FIG. 23G. As a result, the flip-flop 2211 is set so that the output FF3 of the flip-flop 2211 becomes the "1" level, as shown in FIG. 23K, and, accordingly, the output OR of the OR circuit 1820 also becomes the "1" level, as shown in FIG. 23L, thereby starting the third injection time period $\tau_3$. Simultaneously, the counter 2208 is reset to restart the counting of the clock signal $\phi'_2$.

At time $t_7$, when the content of the counter 2208 reaches the content $\tau_3$ of the latch circuit 2209, the comparator 2210 generates a pulse signal, as shown in FIG. 23H. As a result, the flip-flop 2211 is reset so that the output FF3 of the flip-flop 2204 becomes the "0" level, as shown in FIG. 23K, and, accordingly, the output OR of the OR circuit 1820 also becomes the "0" level, as shown in FIG. 23L, thereby ending the third injection time period $\tau_3$.

The driver circuit 1822 receives the output signal OR of the OR circuit 1820, as shown in FIG. 23L. Therefore, the driver circuit 1822 applies a voltage signal as shown in FIG. 23M to the electroexpansive actuator 201 of the fuel injection apparatus 11 of FIG. 16.

The above-mentioned operations as illustrated in FIGS. 16, 17, 18, 19, 20A through 20J, 21, 22, 23, and 24A through 24N can be also applied to a spark-ignition internal combustion engine, i.e., a gasoline engine, thereby improving the air efficiency at a low rotational speed.

Note that, instead of the intake air amount, other parameters, such as the intake air pressure and the rotational speed of the engine, can be used for calculating the fuel injection amount.

We claim:

1. A fuel injection apparatus for an internal combustion engine comprising:
a nozzle body;
a nozzle formed at the bottom of said nozzle body;
an electroexpansive actuator having an electroexpansive effect;
a valve member, slideably mounted within said nozzle body, for opening and closing said nozzle; and
a fuel chamber formed between said electroexpansive actuator and said valve member;
said electroexpansive actuator and said valve member being disposed so that expansion of said electroexpansive actuator reduces the volume of said fuel chamber, thereby moving said valve member in the closed direction of said nozzle and contraction of said electroexpansive actuator increases the volume of said fuel chamber, thereby moving said valve member in the open direction of said nozzle.

2. An apparatus as set forth in claim 1, wherein said electroexpansive actuator comprises a plurality of columnar laminated piezoelectric elements.

3. An apparatus as set forth in claim 1, further comprising a distance piece fixed on the top of said nozzle body, said distance piece having a plurality of fuel passages communicating said fuel chamber with a cylinder defined by said nozzle chamber.

4. An apparatus as set forth in claim 1, further comprising a circular elongated fuel chamber at the bottom of said valve member for receiving pressurized fuel from the outside, said circular elongated fuel chamber leading to said nozzle when said nozzle is opened.

5. An apparatus as set forth in claim 1, further comprising:
means for calculating a fuel injection amount in accordance with a predetermined driving state parameter of said engine with regard to time;
means for calculating a driving signal frequency in accordance with said calculated fuel injection amount;
means for calculating an injection time period in accordance with said calculated fuel injection amount; and
means for applying a signal of said driving signal frequency, having a duration of said calculated injection time period, to said electroexpansive actuator.

6. An apparatus as set forth in claim 5, wherein said fuel injection amount calculating means comprises:
means for calculating the average air amount intaken into said engine with regard to time; and
means for calculating said fuel injection amount in accordance with the calculated average intake air amount.

7. An apparatus as set forth in claim 5, wherein said fuel injection amount calculating means comprises:
means for calculating the average pressure of intake air intaken into said engine with regard to time; and
means for calculating said fuel injection amount in accordance with the calculated average intake air pressure.

8. An apparatus as set forth in claim 5, wherein said fuel injection amount calculating means comprises:
means for calculating the average rotational speed of said engine with regard to time; and
means for calculating said fuel injection amount in accordance with the calculated average rotational speed.

9. An apparatus as set forth in claim 1, further comprising means for applying a plurality of injection signals per one combustion stroke to said electroexpansive actuator.

10. An apparatus as set forth in claim 9, wherein the time period of one of said injection signals is smaller than the time period of the next one of said injection signals.

11. An apparatus as set forth in claim 9, wherein the injection suspension time period t between first and second injection signals within said one combustion stroke is determined by:

$$t = m/Ne \cdot q \cdot THW$$

where
m is a constant;
Ne is the rotational speed of said engine;
q is the fuel injection amount one stroke; and
THW is the coolant temperature.

12. An apparatus as set forth in claim 9, wherein the injection suspension time period t between first and second injection signals within said one combustion stroke is determined by:

$$t = m/Ne \cdot q \cdot THA$$

where
m is a constant;
Ne is the rotational speed of said engine;
q is the fuel injection amount per one stroke; and
THA is the intake air temperature.

13. An apparatus as set forth in claim 9, wherein the injection suspension time period t between first and second injection signals within said one combustion stroke is determined by:

$$t = n/Ne$$

where
n is a constant; and
Ne is the rotational speed of said engine.

14. A fuel injection apparatus for an internal combustion engine comprising:
a nozzle body;
a nozzle formed at the bottom of said nozzle body;
an electroexpansive actuator having an electroexpansive effect;
a valve member, slideably mounted within said nozzle body, for opening and closing said nozzle;
a fuel chamber formed between said electroexpansive actuator and said valve member;
circular elongated fuel chamber means at the bottom of said valve member for receiving pressurized fuel from the outside, said circular elongated fuel chamber means leading to said nozzle when said nozzle is opened; and
a fuel passage through said valve member, said fuel passage communicating said circular elongated fuel chamber means with said fuel chamber when said nozzle is closed; wherein
expansion of said electroexpansive actuator reduces the volume of said fuel chamber to thereby move said valve member in the closed direction of said nozzle; and
contraction of said electroexpansive actuator increases the volume of said fuel chamber to thereby move said valve member in the open direction of said nozzle.

15. An apparatus as set forth in claim 14, further comprising a fuel passage penetrating said nozzle body and leading to said circular elongated fuel chamber means.

16. A fuel injection apparatus for an internal combustion engine comprising:
a nozzle body;
a nozzle formed at the bottom of said nozzle body;
an electroexpansive actuator having an electroexpansive effect;
a valve member, slideably mounted within said nozzle body, for opening and closing said nozzle;
a distance piece fixed on the top of said nozzle body and defining a fuel chamber formed between said electroexpansive actuator and said distance piece, said distance piece having a plurality of fuel passages communicating said fuel chamber with a space between said valve member and said distance piece, and a spring between said distance piece and said valve member, said spring biasing said valve member in the down direction; wherein expansion of said electroexpansive actuator reduces the volume of said fuel chamber to thereby move said valve member in the closed direction of said nozzle; and contraction of said electroexpansive actuator increases the volume of said fuel chamber to thereby move said valve member in the open direction of said nozzle.

17. An apparatus as set forth in claim 16, wherein said fuel injection amount calculating means comprises:
   means for calculating the average air amount intaken into said engine with regard to time; and
   means for calculating said fuel injection amount in accordance with the calculated average intake air amount.

18. An apparatus as set forth in claim 16, wherein said fuel injection amount calculating means comprises:
   means for calculating the average pressure of intake air intaken into said engine with regard to time; and
   means for calculating said fuel injection amount in accordance with the calculated average intake air pressure.

19. An apparatus as set forth in claim 16, wherein said fuel injection amount calculating means comprises:
   means for calculating the average rotational speed of said engine with regard to time; and
   means for calculating said fuel injection amount in accordance with the calculated average rotational speed.

20. A fuel injection apparatus for an internal combustion engine comprising:
   a nozzle body;
   a nozzle formed at the bottom of said nozzle body;
   an electroexpansive actuator having an electroexpansive effect;
   a valve member, slideably mounted within said nozzle body, for opening and closing said nozzle;
   a distance piece fixed on the top of said nozzle body and defining a fuel chamber between said electroexpansive actuator and said distance piece, said distance piece having a plurality of fuel passages communicating said fuel chamber with a space between said valve member and said distance piece;
   a spring on said distance piece; and
   a piston provided between said electroexpansive acturator and said spring, said spring biasing said piston in the contraciting direction of said electroexpansive actuator; wherein
   expansion of said electroexpasive actuator reduces the volume of said fuel chamber to thereby move said valve member in the closed direction of said nozzle; and
   contraction of said electroexpansive actuator increases the volume of said fuel chamber to thereby move said valve member in the open direction of said nozzle.

21. A fuel injection apparatus for an inernal combustion engine comprising:
   a nozzle body;
   a nozzle formed at the bottom of said nozzle body; an electroexpansive actuator having an electroexpansive effect;
   a valve member, slideably mounted within said nozzle body, for opening and closing said nozzle;
   a fuel chamber formed between said electroexpansive actuator and said valve member;
   means for generating a timing signal having a definite frequency;
   means for calculating a fuel injection amount in accordance with a predetermined driving state parameter of said internal engine; and
   means for applying a definite voltage signal, having a time period indicative of said fuel injection amount, to said electroexpansive actuator, each time said timing signal is generated; wherein
   expansion of said electroexpansive actuator reduces the volume of said fuel chamber to thereby move said valve member in the closed direction of said nozzle; and
   contraction of said electroexpansive actuator increases the volume of said fuel chamber to thereby move said valve member in the open direction of said nozzle.

22. A fuel injection apparatus for an enternal combustion engine comprising:
   a nozzle body;
   a nozzle formed at the bottom of said nozzle body;
   an electroexpansive actuator having an electroexpansive effect;
   a valve member, slideably mounted within said nozzle body, for opening and closing said nozzle; and
   a fuel chamber formed between said electroexpansive actuator and said valve member;
   a first fuel passage for supplying pressurized fuel to said nozzle; and
   a second fuel passage selectively opened and closed by said valve member to connect said first fuel passage with said fuel chamber; wherein
   expansion of said electroexpansive actuator reduces the volume of said fuel chamber to thereby move said valve member in the closed direction of said nozzle; and
   contraction of said electroexpansive actuator increases the volume of said fuel chamber to thereby move said valve meber in the open direction of said nozzle.

* * * * *